(12) United States Patent
Elwell, Jr. et al.

(10) Patent No.: US 7,679,561 B2
(45) Date of Patent: Mar. 16, 2010

(54) SYSTEMS AND METHODS FOR POSITIONING USING MULTIPATH SIGNALS

(75) Inventors: John M. Elwell, Jr., Sudbury, MA (US); Donald E. Gustafson, Lexington, MA (US); John R. Dowdle, Arlington, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 576 days.

(21) Appl. No.: 11/335,160

(22) Filed: Jan. 19, 2006

(65) Prior Publication Data

US 2008/0198072 A1 Aug. 21, 2008

Related U.S. Application Data

(60) Provisional application No. 60/645,390, filed on Jan. 19, 2005.

(51) Int. Cl.
G01S 3/02 (2006.01)
(52) U.S. Cl. .................................................. 342/453
(58) Field of Classification Search ................ 342/453, 342/353, 451
See application file for complete search history.

(56) References Cited

U.S. PATENT DOCUMENTS

| | | | |
|---|---|---|---|
| 3,537,008 A | 10/1970 | Lakatos | |
| 3,869,673 A | 3/1975 | Close | |
| 4,433,334 A | 2/1984 | Caputi, Jr. | |
| 4,667,202 A | 5/1987 | Kammerlander et al. | |
| 4,675,880 A | 6/1987 | Davarian | |
| 4,812,991 A | 3/1989 | Hatch | |
| 4,888,593 A | 12/1989 | Friedman et al. | |
| 4,916,455 A | 4/1990 | Bent et al. | |
| 4,975,710 A | 12/1990 | Baghdady | |
| 5,063,560 A | 11/1991 | Yerbury et al. | |
| 5,216,429 A | 6/1993 | Nakagawa et al. | |
| 5,293,642 A | 3/1994 | Lo | |
| 5,296,861 A | 3/1994 | Knight | |
| 5,347,286 A | 9/1994 | Babitch | |
| 5,390,339 A | 2/1995 | Bruckert et al. | |
| 5,414,432 A | 5/1995 | Penny, Jr. et al. | |
| 5,414,729 A | 5/1995 | Fenton et al. | |
| 5,590,043 A | 12/1996 | McBurney | |
| 5,592,180 A | 1/1997 | Yokev et al. | |
| 5,606,732 A | 2/1997 | Vignone, Sr. | |
| 5,608,411 A | 3/1997 | Rose | |

(Continued)

FOREIGN PATENT DOCUMENTS

EP 1143652 10/2001

(Continued)

OTHER PUBLICATIONS

Thomas, N. J. et al, "Caculation of Mobile Location Using Scatterer Information," Elec. Letters,vol. 37, No. 19, Sep. 13, 2001, pp. 11931195.*

(Continued)

*Primary Examiner*—Gregory C Issing
(74) *Attorney, Agent, or Firm*—Goodwin Procter LLP

(57) ABSTRACT

A signal processing technique for RF active, passive, or aided localization approaches that utilizes multipath signals as additional measurements with a filter or estimator, e.g., a nonlinear filter. The filter uses indirect and direct path measurements or any other available signals to build parametric models of observable indirect paths. If one or more direct path measurements are subsequently lost (e.g., due to obstruction), the filter maintains an estimate of the position of the person or object of interest using indirect path measurements.

14 Claims, 10 Drawing Sheets

U.S. PATENT DOCUMENTS

| | | | |
|---|---|---|---|
| 5,630,208 | A | 5/1997 | Enge et al. |
| 5,646,964 | A | 7/1997 | Ushirokawa et al. |
| 5,689,431 | A | 11/1997 | Rudow et al. |
| 5,710,977 | A | 1/1998 | Nakazawa et al. |
| 5,717,406 | A | 2/1998 | Sanderford et al. |
| 5,719,584 | A | 2/1998 | Otto |
| 5,724,047 | A | 3/1998 | Lioio et al. |
| 5,726,659 | A | 3/1998 | Kee et al. |
| 5,740,049 | A | 4/1998 | Kaise et al. |
| 5,745,075 | A | 4/1998 | Enge et al. |
| 5,760,909 | A | 6/1998 | Nichols |
| 5,771,456 | A | 6/1998 | Pon |
| 5,796,773 | A | 8/1998 | Sheynblat |
| 5,815,539 | A | 9/1998 | Lennen |
| 5,828,694 | A | 10/1998 | Schipper |
| 5,883,595 | A | 3/1999 | Colley |
| 5,883,817 | A | 3/1999 | Chisholm et al. |
| 5,903,597 | A | 5/1999 | Pon |
| 5,917,445 | A | 6/1999 | Schipper et al. |
| 5,918,161 | A | 6/1999 | Kumar et al. |
| 5,926,113 | A | 7/1999 | Jones et al. |
| 5,926,133 | A | 7/1999 | Green, Jr. |
| 5,936,573 | A | 8/1999 | Smith |
| 5,949,364 | A | 9/1999 | Katzberg et al. |
| 5,950,140 | A | 9/1999 | Smith |
| 5,963,601 | A | 10/1999 | Pon et al. |
| 5,974,039 | A | 10/1999 | Schilling |
| 5,982,322 | A | 11/1999 | Bickley et al. |
| 5,986,575 | A | 11/1999 | Jones et al. |
| 5,991,345 | A | 11/1999 | Ramasastry |
| 5,999,131 | A | 12/1999 | Sullivan |
| 6,002,361 | A | 12/1999 | Schipper |
| 6,026,304 | A | 2/2000 | Hilsenrath et al. |
| 6,031,601 | A | 2/2000 | McCusker et al. |
| 6,031,881 | A | 2/2000 | Weill et al. |
| 6,054,950 | A | 4/2000 | Fontana |
| 6,061,022 | A | 5/2000 | Menegozzi et al. |
| 6,078,788 | A | 6/2000 | Haardt et al. |
| RE36,791 | E | 7/2000 | Heller |
| 6,084,546 | A | 7/2000 | Wax et al. |
| 6,084,927 | A | 7/2000 | Pon |
| 6,094,168 | A | 7/2000 | Duffett-Smith et al. |
| 6,112,095 | A | 8/2000 | Wax et al. |
| 6,114,989 | A | 9/2000 | Fontes et al. |
| 6,150,921 | A | 11/2000 | Werb et al. |
| 6,150,979 | A | 11/2000 | Tsui |
| 6,163,297 | A | 12/2000 | Rose |
| 6,198,765 | B1 | 3/2001 | Cahn et al. |
| 6,233,459 | B1 | 5/2001 | Sullivan et al. |
| 6,236,365 | B1 | 5/2001 | LeBlanc et al. |
| 6,243,648 | B1 | 6/2001 | Kilfeather et al. |
| 6,255,992 | B1 | 7/2001 | Madden |
| 6,259,401 | B1 | 7/2001 | Woo |
| 6,259,404 | B1 | 7/2001 | Parl et al. |
| 6,263,208 | B1 | 7/2001 | Chang et al. |
| 6,272,350 | B1 | 8/2001 | Tekinay |
| 6,282,426 | B1 * | 8/2001 | Wang ............... 455/456.3 |
| 6,285,318 | B1 | 9/2001 | Schoen et al. |
| 6,292,665 | B1 | 9/2001 | Hildebrand et al. |
| 6,300,903 | B1 | 10/2001 | Richards et al. |
| 6,362,782 | B1 * | 3/2002 | Greenspan et al. ........ 342/453 |
| 6,408,186 | B1 | 6/2002 | Park et al. |
| 6,414,634 | B1 * | 7/2002 | Tekinay ............... 342/453 |
| 6,473,038 | B2 | 10/2002 | Patwari et al. |
| 6,522,296 | B2 | 2/2003 | Holt |
| 6,541,950 | B2 * | 4/2003 | Townsend et al. ........ 324/76.14 |
| 6,593,883 | B2 | 7/2003 | Johnson et al. |
| 6,611,232 | B1 | 8/2003 | Wunderlich et al. |
| 6,634,959 | B2 | 10/2003 | Kuesters |
| 6,693,592 | B2 | 2/2004 | Dowdle et al. ............ 342/453 |
| 6,744,408 | B1 | 6/2004 | Stockmaster |
| 6,744,442 | B1 | 6/2004 | Chan et al. |
| 6,795,019 | B2 | 9/2004 | Holt |
| 6,892,055 | B2 * | 5/2005 | Rosenfeld ............... 455/65 |
| 6,900,758 | B1 * | 5/2005 | Mann et al. ............ 342/357.02 |
| 6,934,626 | B2 | 8/2005 | Tingley |
| 7,205,933 | B1 | 4/2007 | Snodgrass |
| 7,212,159 | B2 * | 5/2007 | Dooley ............... 342/453 |
| 7,212,160 | B2 | 5/2007 | Bertoni et al. |
| 7,313,403 | B2 | 12/2007 | Gong et al. |
| 2002/0050944 | A1 * | 5/2002 | Sheynblat et al. ...... 342/357.06 |
| 2002/0089450 | A1 | 7/2002 | Dowdle et al. |
| 2002/0196186 | A1 | 12/2002 | Holt |
| 2002/0196187 | A1 | 12/2002 | Holt |
| 2002/0196188 | A1 | 12/2002 | Holt |
| 2003/0052821 | A1 | 3/2003 | Holt |
| 2003/0069024 | A1 | 4/2003 | Kennedy |
| 2005/0179591 | A1 | 8/2005 | Bertoni et al. |

FOREIGN PATENT DOCUMENTS

| | | | |
|---|---|---|---|
| JP | 2000346655 | A * | 12/2000 |
| JP | 2001272450 | A * | 10/2001 |
| WO | WO-0181941 | | 11/2001 |
| WO | 02/052225 | | 7/2002 |
| WO | WO 02052225 | A3 * | 7/2002 |
| WO | 03/096055 | | 11/2003 |
| WO | WO 03096055 | A3 * | 11/2003 |

OTHER PUBLICATIONS

Papageorgiou, I. et al, "An Enhanced Received Signal Level Cellular Location Determination Method Via Maximum Likelihood and Kalman Filtering," IEEE WCNC 2005, Mar. 2005, pp. 8.*

Lefebvre, T. et al, "Kalman Filters for Nonlinear Systems: a Comparison of Performance," International Journal of Control, 2001, pp. 5.*

Balboni et al., "An Empirical Study of Radio Propagation Abroad Naval Vessels," Proceedings of Antennas and Propagation for WirelessCommunications, Nov. 6-8, 2000, 4 pgs.

Drane et al., "Positioning GSM Telephones," IEEE Communications Magazine, Apr. 1998, pp. 46-59.

Gustafson et al., "Indoor Geolocation and Mapping Using RF Multipath," Charles Stark Draper Laboratory, Cambridge, MA, DARPA Urban Propagation Workshop, San Diego, CA, Oct. 5, 2006, 23 pages.

Gustafson et al., "Innovative Indoor Geolocation Using RF Multipath Diversity," Contract No. FA8650-06-C-7642, CWINS & Draper Proprietary, Feb. 27, 2007, 81 pages.

Howard et al., "Measurement and Analysis of the Indoor Radio Channel in the Frequency Domain," IEEE Transactions on Instrumentation and Measurement, vol. 39, No. 5, Oct. 1990, pp. 751-755.

Krishnamurthy, "Analysis and Modeling of the Wideband Radio Channel for Indoor Geolocation Applications," Ph.D. Dissertation, Worcester Polytechnic Institute, Aug. 2, 1999, 172 pages.

Pahlavan et al., "Indoor Geolocation Science and Technology," IEEE Communications Magazine, Feb. 2002, pp. 112-118.

Pahlavan et al., "Wideband Radio Propagation Modeling for Indoor Geolocation Applications," IEEE Communications Magazine, Apr. 1998, pp. 60-65.

Peterson et al., "Measuring GPS Signals Indoors," The British Library, previously published at the U.S. Institute of Navigation Conference, ION GPS '97, Sep. 1997, 8 pages.

Rappaport et al., "Position Location Using Wireless Communications on Highways of the Future," IEEE Communications Magazine, Oct. 1996, pp. 33-41.

Tingley et al, "A Comparison of Two Techniques for Parameter Estimation of an Indoor Radio Channel," Proceedings of Wireless '99, Calgary, Alberta, Canada, Jul. 12-14, 1999, pp. 94-101.

Turin, "Introduction to Spread-Spectrum Antimultipath Techniques and Their Application to Urban Digital Radio," IEEE Proceedings, vol. 68, No. 3, Mar. 1980, pp. 328-353.

Watson et al., "Investigating GPS Signals Indoors with Extreme High-Sensitivity Detection Techniques," Journal of the Institute of Navigation, vol. 52, No. 4, Winter 2005-2006, received Jun. 2005, revised Feb. 2006, pp. 199-213.

Werb et al., "Designing a Positioning System for Finding Things and People Indoors," IEEE Spectrum, Sep. 1998, pp. 71-78.

Yousef et al., "Robust Time-Delay and Amplitude Estimation for CDMA Location Finding," IEEE Proceedings of the Vehicular Technology Conference, Fall 1999, vol. 4, Delft, The Netherlands, Sep. 1999, pp. 2163-2167.

Written Opinion for PCT Application No. PCT/US06/001811, mailed Jun. 19, 2006, 5 pages.

Examination Report for European Patent Application No. 06748164.8, mailed Mar. 19, 2009, 3 pages.

International Search Report for PCT Application No. PCT/US2008/076652, mailed Jun. 4, 2009, 3 pages.

Written Opinion for PCT Application No. PCT/US2008/076652, mailed Jun. 4, 2009, 6 pages.

* cited by examiner (B)

(A)

FIG. A-1
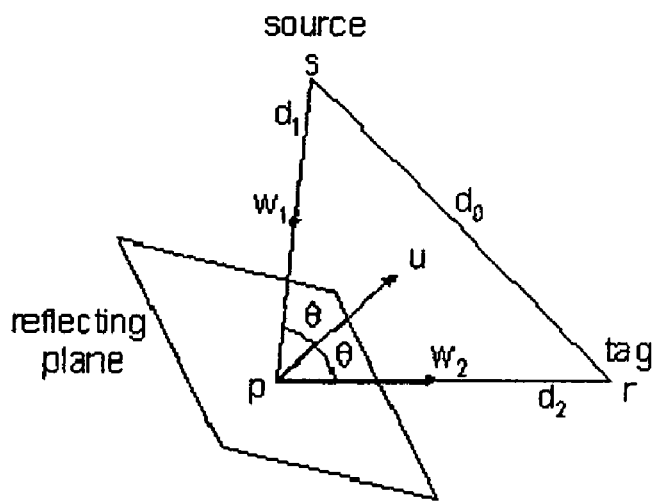
FIG. A-2
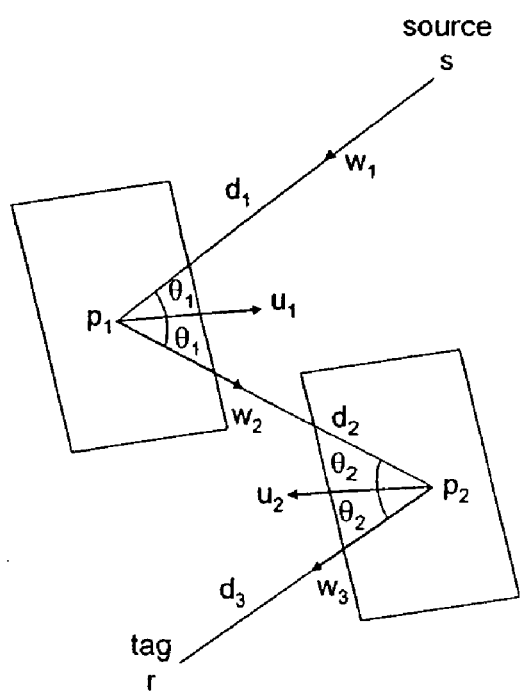

SYSTEMS AND METHODS FOR POSITIONING USING MULTIPATH SIGNALS

CROSS-REFERENCE TO RELATED CASES

This application claims the benefit of U.S. Provisional Patent Application No. 60/645,390, filed on Jan. 19, 2005, which is incorporated by reference as if set forth herein in its entirety. The application also incorporates the disclosure of U.S. Pat. No. 6,693,592, issued on Feb. 17, 2004, as if set forth in its entirety herein.

FIELD OF THE INVENTION

The present invention relates generally to systems and methods for navigation and positioning, and more specifically to systems and methods for navigation and positioning using multipath signals.

BACKGROUND OF THE INVENTION

There have been several attempts to use radio-frequency (RF) signals to position people or assets moving within a cluttered environment such as an urban canyon or an enclosed structure such as a building. Generally speaking, these prior art attempts typically utilize fixed reference stations or beacons together with some form of receiving or responding tag on the object to be tracked. With this apparatus, a form of triangulation using RF signal strength (RSS), time of arrival (TOA), time difference of arrival (TDOA), or angle of arrival (AOA) phenomena from the reference stations is used to determine the position of the tag.

One deficiency of most of these prior art approaches is that they are adversely affected by the RF multipath signals generated in cluttered environments. Multipath signals can result in incorrect measurements of RSS, TOA, TDOA, and AOA phenomena when the direct path between the reference beacon and the tag cannot be reliably and consistently measured. Accordingly, these approaches typically treat multipath signals as an error to be eliminated in order to provide accurate position results.

A representative first class of approaches to the positioning problem include inertial systems; inertial systems with zero velocity updates at each stop; and augmentation or updating with Doppler measurements, barometric altitude, magnetometers, or vision systems. This class of approaches sometimes requires special algorithms to identify repeated crossing points or to provide active inertial calibration, and typically requires prior knowledge of the building dimensions and layout. Some of these approaches utilize global positioning system (GPS) or cell phone navigation aids such as E911 to the extent that a signal can be faithfully received in the cluttered environment amid shadowing.

A second class of approaches employs a cooperative infrastructure using 802.11x, Bluetooth, or another RF technique, with some infrastructures specially designed for such purposes. One specific approach uses the signal strength of network element transmitters as received by several transceivers, further mapped and calibrated against the known building structure to account for effects like absorption, refraction, and reflection. Another approach uses carrier phase measurements taken by a triangulating set of specialized transmitters or receivers. In this second class, RFID technology may also be employed to locate objects over relatively small areas, but typically requires many integrating sensors to be practical over larger areas.

One issue associated with the first class of autonomous approaches is cost. While these approaches can provide good performance, they typically employ costly elements and integrate into a costly system. Furthermore, this class of approaches typically requires each person or object to carry a navigation device, which can make the overall system expensive. While such approaches are suited to applications where autonomy is important and cost is somewhat less important, their application to commercial applications can be cost prohibitive.

Approaches from the second class enjoy the advantage of having their primary cost embedded in their infrastructure. That cost is subsequently amortized across individual users, each of whom would carry a relatively low cost receiver or transponder such as a personal digital assistant equipped with 802.11x technology. However, approaches from the second class still typically suffer from sensitivity to multipath signals.

Accordingly, there is a need for improved systems and methods that can position people or assets moving within a cluttered environment such as an urban canyon or an enclosed structure such as a building without suffering adverse effects from the multipath signals generated in these environments.

SUMMARY OF THE INVENTION

The present invention relates to systems and methods for positioning people or assets moving within a cluttered environment such as an urban canyon or an enclosed structure such as a building. The systems and methods of the present invention recognize that substantial energy is available even when the direct path (DP) is absent or undetected, and that significant information is conveyed by the multipath signals resulting when transmitted signals are reflected by various objects within the local environment.

Embodiments of the present invention recognize that in a real, physical environment, assuming small spatial separations, many multipath components are shared and common. Accordingly, embodiments of the present invention construct a model of the environment using recursive estimation techniques. These techniques allow for the generation of new paths as they become significant, and the termination of old paths as they become irrelevant. Thus, the need for a priori knowledge of the local infrastructure is eliminated through efficient use of available information, including the signals between each individual multipath element and each received transmitting location.

Embodiments of the present invention directly use measured multipath TOA delay for localization and tracking. Differential delays are tracked in real time using Rake filters or similar means. As discussed below, the relationship between the differential delay for a single path at a single time and the three-dimensional location of a tag may be described using four parameters for any number of reflections. With knowledge of this relationship, multipath parameters may be estimated in real time using direct path, indirect path and other available measurements. These multipath parameters may then subsequently be used in conjunction with estimation techniques for three-dimensional localization or tracking if direct paths are blocked or other measurements become unavailable.

Even when knowledge of the multipath parameters describing the relationship between the differential delay and tag location is insufficient to determine a full multipath solution (i.e., providing the location of the specular reflection points), a geolocation solution typically does not require the full multipath solution. Geolocation using multipath signals may be accomplished in situations when the multipath parameters are determinable from the combined observation of the direct and indirect path measurements or from prior initial knowledge of the position. The time-integrated buildup of multipath parameters may then be usable to provide an image of the interior of the building structure.

In certain situations, filtering methods using linearization (e.g., extended Kalman filters) are not appropriate, since the relationship between the measurements and the filter states may be highly nonlinear. For example, multipath reflections may result in at least bilinear measurements involving multipath parameters and tag locations. For at least this reason, nonlinear filtering techniques such as particle filtering, which do not depend on linearization assumptions or specified probability distributions, may be used. Particle filtering may be particularly useful when the initial tag position uncertainty is very large. If the initial tag position is relatively small, extended Kalman filtering may suffice.

In one aspect, the present invention relates a method for positioning using a multipath wireless signal. An initial position is determined and information is generated relating at least one position, such as the initial position, to at least one characteristic of at least one multipath wireless signal received at the at least one position. A subsequent wireless multipath signal is received and a position is established based on the subsequent signal and the generated information. The wireless multipath signal may be generated by a transmitter, such as a GPS transmitter. The generated information typically includes at least one parameter.

In one embodiment, determining an initial position includes causing a tag to receive, at a plurality of positions, at least one transmitted signal. The magnitude of the at least one signal received by the tag is determined at each position, and also at the initial position. Then, the determined signal magnitudes are used with a statistical model to estimate the initial position. The statistical model may include data indicative of signal propagation characteristics associated with a signal space between the tag and each of a plurality of signal transmitters. In another embodiment, determining the initial position includes making a direct path measurement of the initial position, such as a measurement of received signal strength. In still another embodiment, determining the initial position includes utilizing prior knowledge of the initial position.

In another embodiment, establishing a position includes computing a plurality of candidate locations and selecting a most likely location thereform. The most likely location may be determined using a statistical test.

In still another embodiment, generating information includes characterizing at least a partial geometry of the interior environment and a geometry of multipath signals therein, the multipath geometry comprising lengths of indirect path segments from a wireless source to points of reflection within the environment. The indirect path-segment lengths may be represented by path delay-measurements.

In various embodiments, the at least one characteristic may comprise path delay or path-segment lengths. In these embodiments, the generated information may relate path delay or path-segment lengths to locations within the environment.

In another aspect, the present invention relates to an apparatus for positioning using a multipath wireless signal. The apparatus includes a memory having information relating at least one position, such as the initial position, to at least one characteristic of at least one multipath wireless signal received at the at least one position, a receiver for receiving a subsequent wireless multipath signal, and circuitry for determining a position based on the subsequent signal and the generated information. The at least one characteristic may be, for example, path delay or path-segment lengths and the information may accordingly relate path delay or path-segment lengths to locations within the environment. The wireless multipath signal may be generated by a transmitter, e.g., a global positioning system (GPS) transmitter.

In one embodiment, the information characterizes at least a partial geometry of the interior environment and a geometry of multipath signals therein, the multipath geometry comprising lengths of indirect path segments from a wireless source to points of reflection within the environment. The indirect path-segment lengths may be represented by path-delay measurements.

The foregoing and other features and advantages of the present invention will be made more apparent from the description, drawings, and claims that follow.

BRIEF DESCRIPTION OF DRAWINGS

The advantages of the invention may be better understood by referring to the following drawings taken in conjunction with the accompanying description in which.

Figure 1:
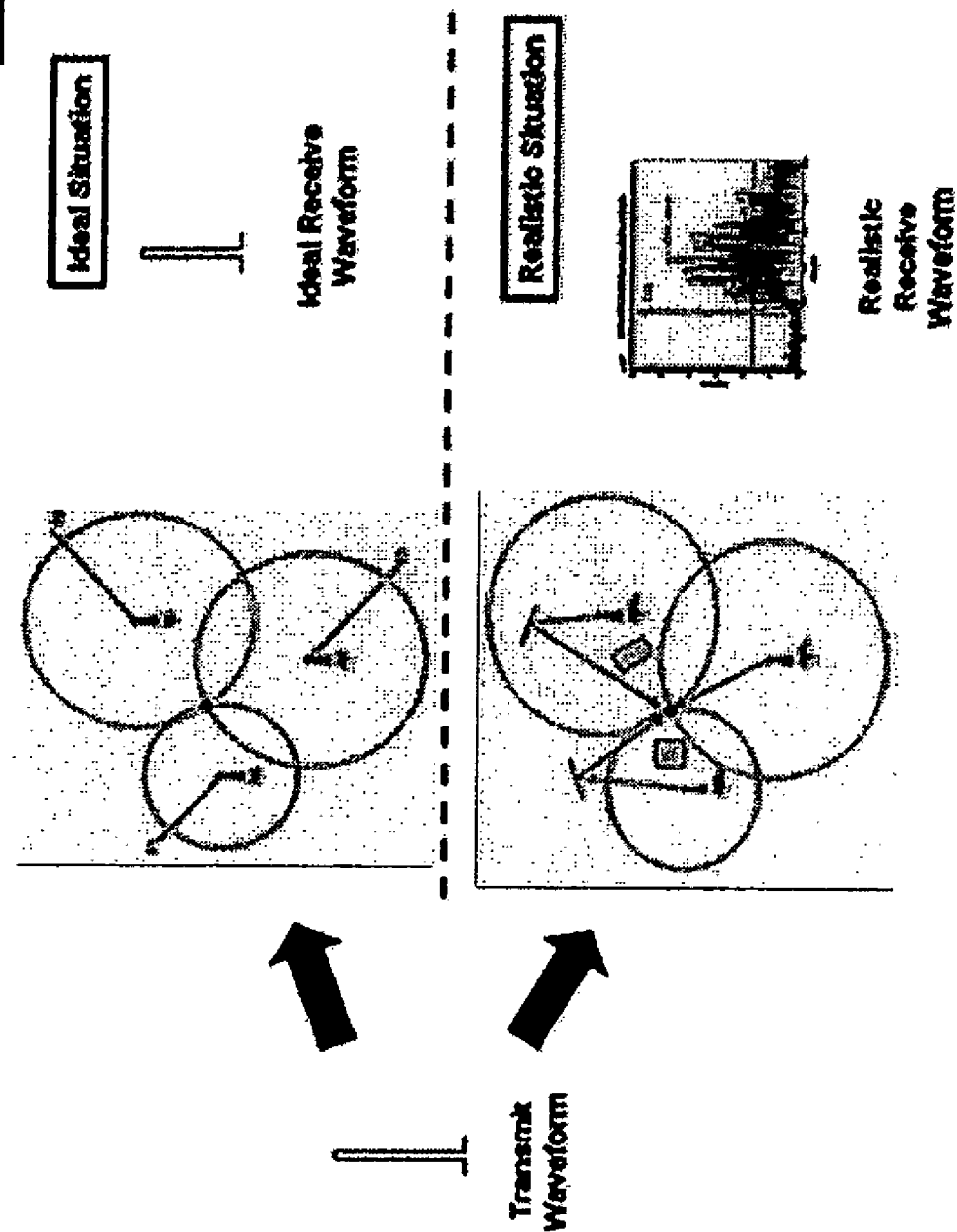
FIG. 1 presents an example of an indoor navigation approach using a set of known fixed transmitters, transponders, or beacons in conjunction with mobile tags or translators attached to the person or object of interest.

FIG. A-1 is another depiction of the geometry associated with a single specular reflection; and FIG. A-2 is another figure illustrating the geometry for two consecutive specular reflections.

In the drawings, like reference characters generally refer to corresponding parts throughout the different views. The drawings are not necessarily to scale, emphasis instead being placed on the principles and concepts of the invention.

DETAILED DESCRIPTION OF THE INVENTION

A number of approaches have been proposed for tracking people and objects inside buildings or in cluttered urban environments where GPS is not usable. Most of these approaches use RF phenomena, and performance typically depends upon the ability to determine the direct path distance from a number of reference sources to the person or object of interest. While many of these approaches have had some success, most have been limited in performance and reliability by RF multipath. Because of the many reflections and path attenuations that occur inside a typical building, an inability to consistently and reliably identify direct path distances has limited the effectiveness of these approaches.

In brief overview, embodiments of the present invention provide a signal processing technique that may be applied to indoor RF active, passive, or aided localization approaches. Rather than treating multipath signals as noise and attempting to mitigate multipath-induced errors, this technique utilizes multipath signals as additional measurements with a filter or estimator, e.g., a nonlinear filter. The filter uses indirect and direct path measurements (or any other available signals) to build parametric models of observable indirect paths. If one or more direct path measurements are subsequently lost (e.g., due to obstruction), the filter maintains an estimate of the position of the person or object of interest using the indirect path measurements. Accordingly, embodiments of the present invention can use multipath signals in indoor navigation applications to maintain tracking accuracy in scenarios where direct-path techniques fail, reducing or eliminating the need for a priori knowledge of the local infrastructure, enabling efficient use of all available information, and advantageously utilizing information redundancy.

In connection with these developments, it has been determined that the indirect path distance for specular reflections from planar surfaces can be modeled using only two parameters in two dimensions and three parameters in three dimensions, no matter the number of specular reflections. Using this model, as discussed in detail below, the aforementioned parametric models are estimated in real time.

In one embodiment, time delay measurements of the direct and indirect multipath signals are processed using one or more of data association, initialization, parameter estimation, and tracking filters. The data association algorithm is used to enhance tracking of intermittent direct and indirect path measurements. In another embodiment, a particle filter may be used to reduce the initial position uncertainty to a region where an extended Kalman filter can be used for both indirect path parameter estimation and tracking. In further embodiments, dead-reckoning sensors may be used to slow error growth in measurements or aid in the data association process.

Overview of Direct Path Positioning

A significant issue with positioning in an urban environment is determining the location of individuals or assets as they move about inside enclosed structures or between closely spaced buildings. A number of approaches to this problem utilizing RF phenomena have been proposed. Many different indoor navigation approaches are currently under development which use a set of known fixed transmitters, transponders, or beacons in conjunction with mobile tags or translators attached to the person or object of interest, an example of which is presented in FIG. 1.

RF location sensors are able to measure RSS, AOA, TOA, TDOA, and the signature of the delay-power profile as possible location metrics. In general, the easy to measure RSS and AOA provide unreliable results. TOA sensors provide a more accurate measure of distance, but TOA performance typically depends on determining the direct path distance from a number of reference sources to the person or object of interest, typically using the arrival time of the first detected peak. Past approaches to determining direct path distance have involved chasing the direct line of sight arrival to the noise floor using ultrawideband probe waveforms, both of which have had marginal benefit.

Figure 2:
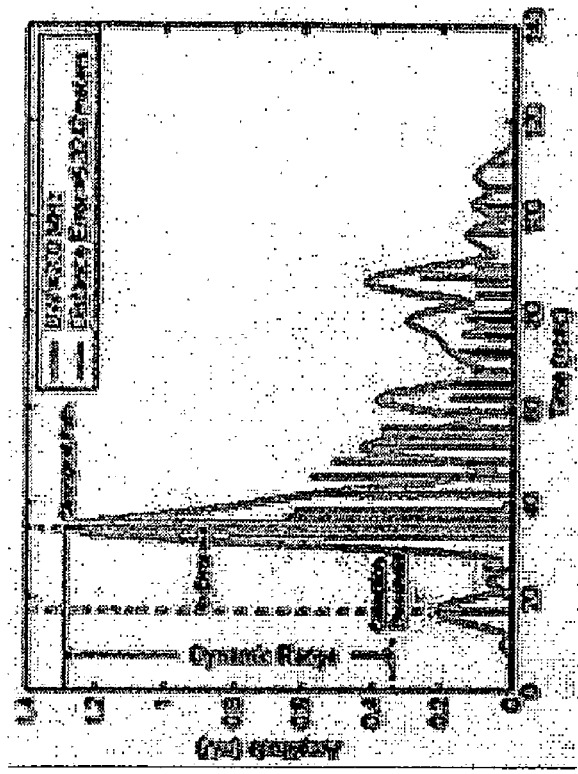
FIG. 2A illustrates a building having interior transceivers and a roving object equipped with a tag.
FIG. 2B depicts an example signal received at the roving tag from a single transceiver.
Figure 2:
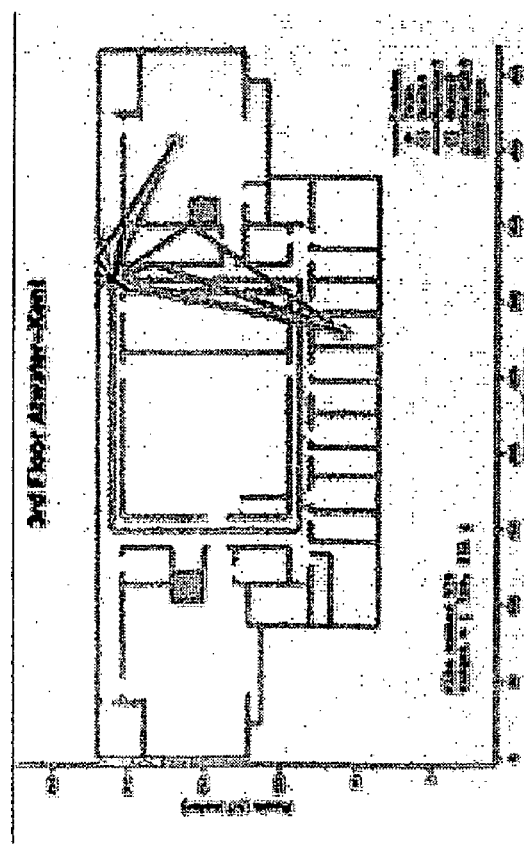

FIG. 2A presents an example of a building having interior transceivers and a roving object equipped with a tag. FIG. 2A also illustrates the last ten rays from the transceivers arriving at the tag, with some rays arriving directly, some rays blocked by metallic objects, and some rays deflected and arriving after multiple reflections.

FIG. 2B presents an example of the signal received at the roving tag from any single transceiver. The DP from the transceiver to the tag gives the expected value of the TOA. Other indirect signals experiencing a number of reflections and transmissions would arrive at the tag after the DP signal. In practice, since transceiver bandwidth is limited, the signal received at the tag will have amplitudes and arrival times like impulse signals, but shapes more similar to a pulse signal. The sum of these pulse shapes forms the signal received at the tag, which is referred to herein as the "channel profile." Super-resolution techniques, such as the MUSIC algorithm or traditional cross-correlation techniques with DSSS signals, may be used to separate these TOA elements with high resolution.

With further reference to FIG. 2B, indoor navigation systems typically treat the first peak in the channel profile rising above the detection threshold as the estimated TOA of the DP. Assuming that the tag is operating in a single path environment, the actual expected DP and the estimated DP will typically be the same. However, in an environment generating multipath signals, the peak of the channel profile shifts away from the expected TOA resulting in an estimation error. The ranging error caused by this erroneous estimate of the TOA is referred to herein as the "distance measurement error" (DME). As the transmission bandwidth of the system increases, the pulses arriving from different paths become narrower and the estimated TOA of the first DP approaches the expected TOA value.

In obstructed line-of-sight multipath conditions, when the magnitude of the DP signal dips below the detection threshold, the first DP appearing in the channel profile is independent of the actual arrival time of the DP, and an undetected direct path (UDP) condition occurs causing a large DME value. FIG. 2B illustrates how a large DME may occur due to such a UDP condition, in this case resulting from simulated ray-tracing for a transmitted pulse with a bandwidth of 200 MHz. Since the difference between the strongest path received and the DP itself exceeds the dynamic bandwidth of the receiver, the result is a UDP condition. The DME resulting from the UDP condition may persist even if the bandwidth is increased to ultrawideband to resolve all multipath components of the channel impulse response.

Multipath Positioning

Figure 3:
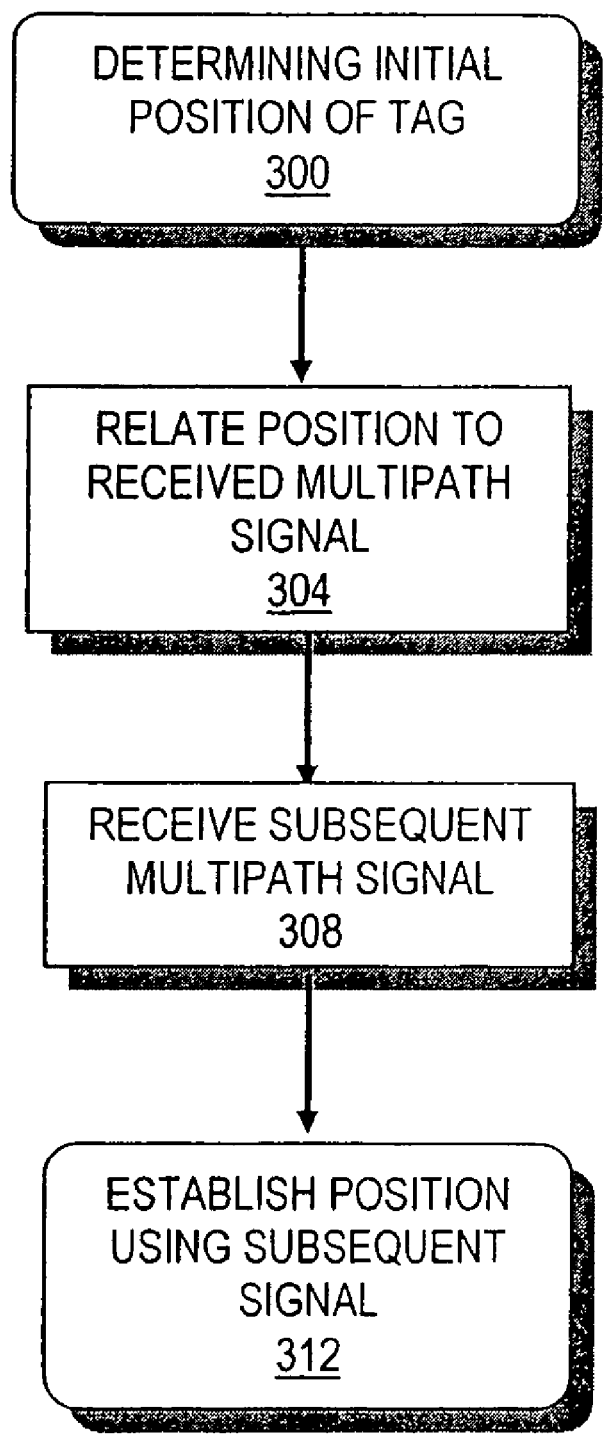
FIG. 3 is a flowchart of a method in accord with one embodiment of the present invention.

With reference to FIG. 3, an embodiment of the present invention begins with an estimate of the initial position of the tag (Step 300). Such an estimate can be determined, for example, through the use of GPS positioning, a priori knowledge of the tag location, or by constraining the tag trajectory to a known path.

With an estimate of the initial position, a parametric model is developed relating the position to a determined characteristic of a received multipath signal (Step 304). The multipath signal may be received, for example, either at the tag or at one of the transceivers. The parametric model and its development is discussed in greater detail below.

With this information relating the position of the tag to a determined characteristic of a received multipath signal, subsequent multipath signals are received (Step 308). The application of the subsequent multipath signals to the filter using a parametric model in accord with the present invention results in an estimate of the position of the tag (Step 312).

Figure 4:
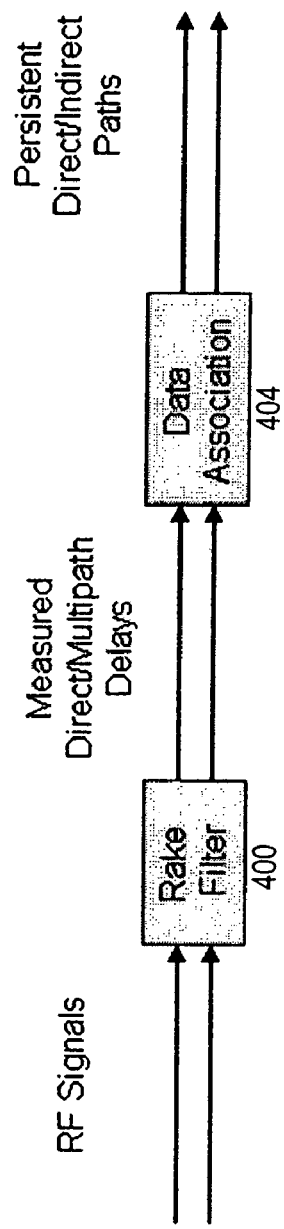
FIG. 4 is a block diagram of one embodiment of preprocessing in accord with the present invention.

With reference to FIG. 4, in one embodiment the received multipath signals are first preprocessed before they are used to generate information relating a position to a characteristic of a multipath wireless signal or to establish a position using subsequent multipath signals. The output of the preprocessing step includes a set of indirect paths that persist for a sufficient length of time to allow for the accurate estimation of the indirect path (multipath) parameters in subsequent steps.

Preprocessing may include, for example, the use of a Rake filter (Step 400) to detect the individual signal paths (both direct and indirect) and to calculate a set of measurement delays (equivalently, the measured distances along the paths). Rake filter preprocessing may then be followed by the application of a data association algorithm (Step 404), which operates to mitigate the effects of path crossover and tracks the paths through dropout periods. The output from the data association algorithm is a set of indirect paths that persist for a sufficient length of time to allow for the accurate estimation of the indirect path (multipath) parameters in subsequent steps.

Figure 5:
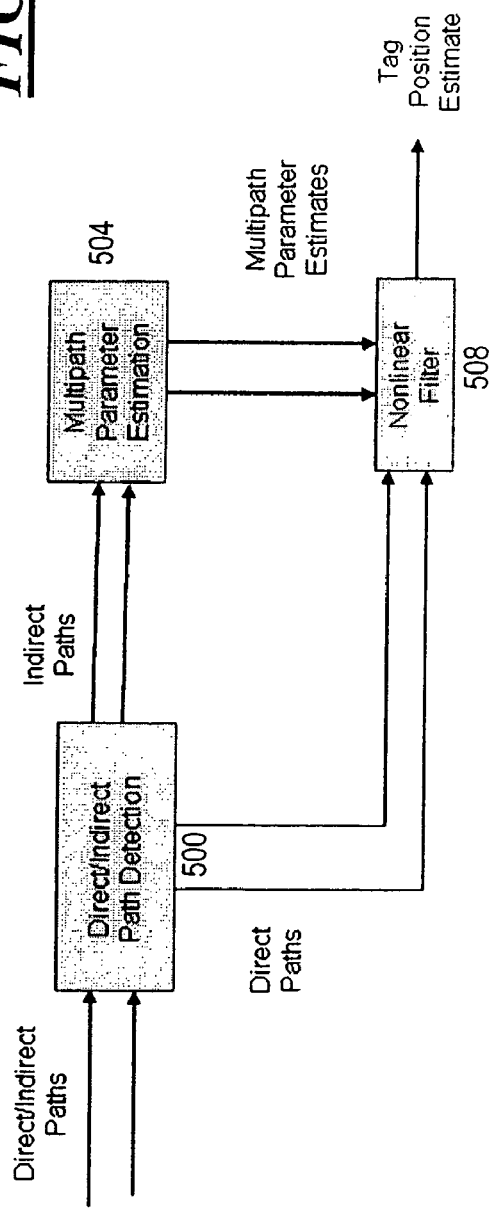
FIG. 5 illustrates a block diagram of one embodiment of tag geolocation in accord with the present invention.

With reference to FIG. 5, the indirect path data—either in a raw form or from a preprocessing step such as a data association algorithm—is processed to detect and identify the direct and indirect paths (Step 500). Indirect path measurements are used to determine initial estimates of the indirect path (multipath) parameters (Step 504) using a multipath model as discussed below. Then, nonlinear filtering techniques are used with the initial estimates and subsequent direct path and indirect path measurements to determine the tag's position (Step 508).

Figure 6:
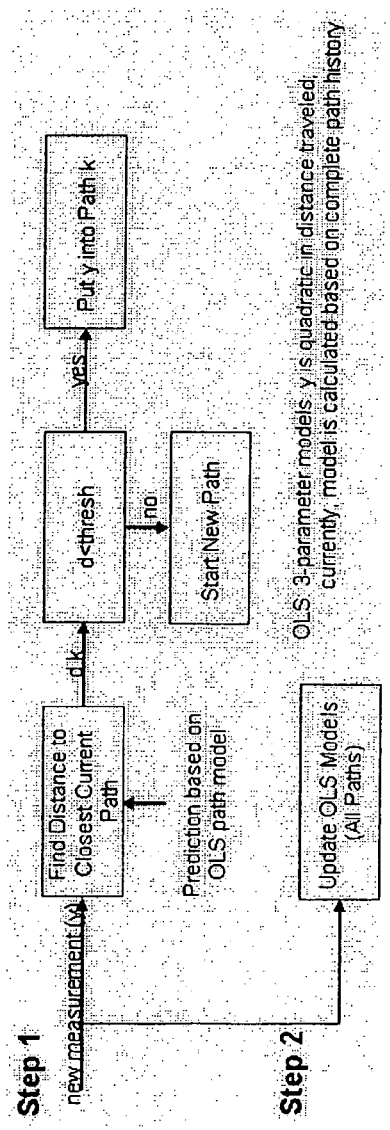
FIG. 6 is a block diagram of one embodiment of data association in accord with the present invention.

FIG. 6 presents another embodiment of the data association process. In this embodiment, the path lengths are modeled with a low-order polynomial model using ordinary least-squares (OLS) analysis. A new measurement is associated with an existing path if the measurement difference is less than a threshold and is the minimum over all existing paths. If not, a new path is created.

Multipath Models and Parameter Estimation

In general, the process of determining multipath solutions is distinguishable from a process for obtaining navigation or geolocation solutions. Multipath solutions arise from the geometry of the multipath and may be determined for configurations in which the positions of a wireless source and a receiver are known to a sufficient degree of specificity as well as the locations and orientations of all reflecting planes.

Multipath solutions generally contain information indicative of the length of the indirect path segments from the wireless source to the locations of the points of reflection. The length of an indirect path segment may also be represented by a path-delay measurement that corresponds to the propagation delay associated with a wireless signal propagating along the individual path segments comprising the multipath. In contrast, geolocation solutions estimate the tag position from a series of indirect and direct path delay measurements. As a result, geolocation solutions can function without requiring estimates of all of the multipath variables, but instead only a subset of them.

Under multipath conditions, it is possible to track tag location directly from the measurements of indirect path delay (Step 308) using a model relating tag location to indirect path length (Step 312). This model can be generated and updated in real time (Step 304) using an initial tag location estimate (Step 300), typically obtained by other means.

Figure 7:
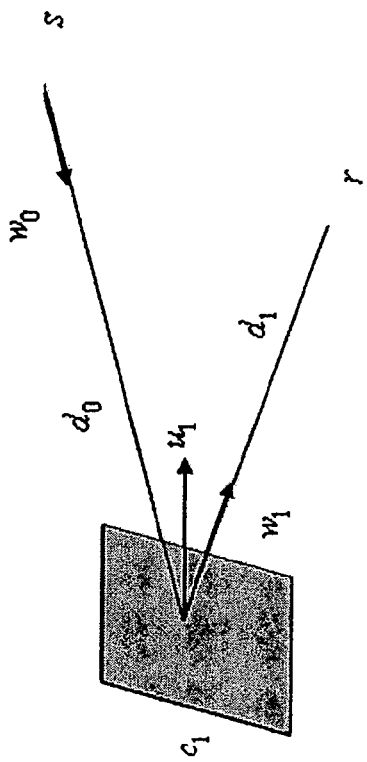
FIG. 7 shows the geometry associated with a single specular reflection.

With reference to FIG. 7, the derivation of this model begins by assuming ideal specular reflection from a single planar surface. The following equation describes the relation between indirect path length $\tau = d_0 + d_1$ and tag location vector r:

$$\tau w_1 = r + E_1 s - 2u_1 c_1$$

where $w_1$ is a unit vector; s is the location of the signal source; $u_1$ is the unit vector defining the reflecting plane orientation; $c_1$ is the scalar satisfying $u_1^T r_p = c_1$, such that $r_p$ is any point in the reflecting plane; and $E_1 = 2u_1 u_1^T - I$, which represents the transformation (or reflection) matrix associated with the reflection plane.

Assuming that the reflecting plane and s are fixed, the indirect path length at time t satisfies:

$$\tau(t) w_w(t) = r(t) + E_1 s - 2u_1 c_1 = r(t) + \rho_0$$

where $\rho_0$ is constant. Thus:

$$\tau(t) = w_1^T(t)[r(t) + \rho_0] = w_1^T(t) r(t) + \tau_0(t) \qquad (1)$$

If the signal source is not too close to the reflecting plane, then the four multipath parameters $w_1(t)$ and $\tau_0(t)$ are essentially constant if r(t) is assumed to be confined to a suitably small region. This allows the estimation of $w_1$ and $\tau_0$ within the region using standard filtering or estimation techniques if substantially simultaneous measurements of $\tau(t)$ and r(t) are available and the tag is in motion.

These multipath parameter estimates can subsequently be used to track r(t) using indirect path measurements when other measurements of r(t) are unavailable (for example, when the direct path is lost). Since r(t), $w_1(i)$ and $\tau_0(i)$ are random variables and measurement of r(i) is subject to error, a nonlinear filter is required to accurately track tag location r(i).

Figure 8:
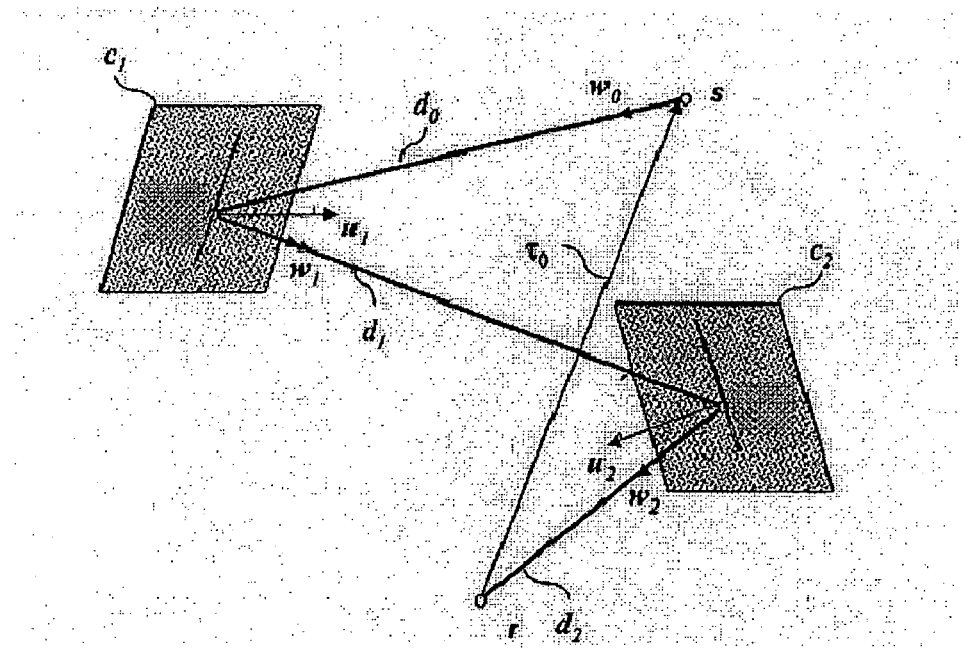
FIG. 8 illustrates the geometry for two consecutive specular reflections.

While this analysis is presented for a single multipath bounce, the results are applicable independent of the number of multipath reflections that take place, although the four multipath parameters have a different analytical form. For example, FIG. 8 presents the generalized three-dimensional multipath geometry for two specular reflections. The geometry is similar to that illustrated in FIG. 7, with the inclusion of a second reflecting surface defined by a unit vector $u_2$ and a scalar value $c_2$. The following equation describes the relationship between indirect path length $\tau = d_0 + d_1 + d_2$ and tag location vector r:

$$\tau w_2 = r - E_2 E_1 s + 2 E_2 c_1 u_1 - 2 c_2 u_2$$

where $$E_2 = 2 u_2 u_2^T - I.$$

and $E_2$ represents the transformation (or reflection) matrix associated with the second reflection plane $c_2$.

Assuming that both reflecting planes and the signal source are fixed, the indirect path length at time t can be described as:

$$\tau(t) w_2(t) = r(t) - E_2 E_1 s + 2 E_2 u_1 c_1 - 2 u_2 c_2 = r(t) + \rho_{02}$$

where $\rho_{02}$ is constant. Thus:

$$\tau(t)=w_2^T(t)[r(t)+\rho_{02}]=w_2^T(t)r(t)+\tau_{02}(t) \quad (2)$$

which is of the same form as the one reflection case (i.e., (1)).

Equations (1) and (2) are both in the form of a measurement equation which can be used by an appropriate filter (e.g., an extended Kalman filter, a nonlinear filter, a particle filter) to simultaneously estimate the tag position r and the four multipath parameters $\{w_2, \tau_{02}\}$.

As discussed in Appendix A, the single and double multipath cases may be generalized to formulate an expression for indirect path length as a function of tag location and four parameters for any number of specular reflections. For n reflections, the four parameters are $\{w_n, \tau_{0n}\}$, where $w_n$ is the unit vector in the direction of the path from the last reflecting surface and $\tau_{0n}$ is the scalar geometry-dependent offset. Since $w_n$ can be expressed as a function of two angles, there are only three independent parameters to be estimated.

It has been empirically determined from simulation that the most robust model (i.e., four parameter or three parameter) is application-dependent.

Statistical Modeling and Nonlinear Filtering

In one embodiment, a nonlinear filter is used to simultaneously estimate the aforementioned multipath parameters and the tag location, since the time delays $\tau(t)$ for the indirect paths (i.e., Equations (1) and (2)) are bilinear functions of the multipath unit vector $w_n(t)$ and the tag position $r(t)$.

The particular type of nonlinear filter most suited to a particular application depends on the details of the application. If the error in the initial tag position is relatively small, then an extended Kalman filter may suffice [see A. H. Jazwinski, *Stochastic Processes and Filtering Theory*, Academic Press, New York, 1970; *Applied Optimal Estimation*, A. Gelb, ed., MIT Press, 1974]. If the error in the initial tag position is relatively large, a particle filter may give better performance [see B. Ristic, S. Arulampalam, N. Gordon, *Beyond the Kalman Filter* Artech House, Boston, 2004]. To simplify the following discussion, the use of an extended Kalman filter is assumed.

The statistical model consists of a state vector, a statistical propagation model, and a statistical measurement model. If the state vector is x(t), then the statistical model may be, for example:

$$x(t) = \begin{bmatrix} r(t) \\ v(t) \end{bmatrix} \quad (3)$$

where v(t) is tag velocity.

Assuming the state vector definition of (3), a possible statistical model for propagating the state vector from time $t_i$ to time $t_{i+1}$ is:

$$x(t_{i+1}) = \Phi(i+1, i)x(t_i) + u(t_i) + q(t_i),$$

$$\Phi(t_{i+1}, t_i) = \begin{bmatrix} I & I(t_{i+1} - t_i) \\ 0 & I \end{bmatrix} \quad (4)$$

where $\Phi(t_{i+1}, t_i)$ is the state transition matrix, $u(t_i)$ is a known control input, I is the identity matrix, and $q(t_i)$ is a zero-mean white driving noise used to model uncertainties in the knowledge of the true propagation model. This model is generally applicable for small time steps $t_{i+1}-t_i$ and relatively constant tag velocities.

Within the filter, the estimated state is propagated using:

$$\hat{x}(t_{i+1})=\Phi(t_{i+1}, t_i)\hat{x}(t_i)+u(t_i) \quad (5)$$

The filter also carries an estimate of the error covariance matrix $P(t_i)=E\{e(t_i)e(t_i)^T\}$, where $e(t_i)=\hat{x}(t_i)-x(t_i)$, and superscript T denotes matrix transpose. The error covariance matrix is propagated in the filter using:

$$P'(t_{i+1})=\Phi(t_{i+1}, t_i)P(t_{i+1})\Phi^T(t_{i+1}, t_i)+Q(t_i) \quad (6)$$

where $Q(t_i)=E\{q(t_i)q(t_i)^T\}$, and where $E\{\bullet\}$ denotes mathematical expectation of the quantity within the brackets.

Under our assumed model, two distinct measurements are available: direct path delay measurements and indirect path delay measurements. A direct path delay measurement from a transmitting node to the tag at time $t_i$ is modeled as:

$$d_{meas}(t_i)=\|r(t_i)-s\|+n_d(t_i) \quad (7)$$

where s is the known location of the transmitting node, $\|z\|$ denotes the length of the vector z, and the measurement noise $n_d(t_i)$ is modeled as a zero-mean white noise with variance $\sigma_d^2(t_i)=E\{n_d^2(t_i)\}$. An indirect path delay measurement from a transmitting node to the tag is modeled as:

$$\tau_{meas}(t_i)=w^T(t_i)r(t_i)+\tau_0(t_i)+n(t_i) \quad (8)$$

where $n(t_i)$ is zero-mean white noise with variance $\sigma_n^2(t_i)$. As noted previously, this model for an indirect path measurement is applicable for any number of specular reflections.

Measurement Updating

Successful navigation in multipath environments requires accurate estimates of the multipath parameters and the state vector simultaneously in real time. This formulation allows these goals to be realized by using well-known tools of nonlinear filtering theory. In particular, the bilinear form of the indirect path measurements lends itself to particularly simple recursive nonlinear filter mechanizations.

Consider the process of updating the state vector estimate and error covariance matrix estimate using a direct path measurement. This is a straightforward application of standard nonlinear filtering methods, including extended Kalman filtering and particle filtering. For simplicity, the following discussion assumes the use of an extended Kalman filter.

The direct path measurement is given by (7). Accordingly, the filter's estimate of this measurement is:

$$d'_{meas}(t_i)=\|r'(t_i)-s\| \quad (9)$$

where a prime ( )' is used throughout to denote association with the value of a variable just prior to measurement updating. A standard extended Kalman filter is then used to update the state vector estimate and the error covariance matrix estimate using the following equations:

$$\hat{x}(t_i)=x'(t_i)+K_d(t_i)v_d(t_i) \quad (10)$$

$$P(t_i)=P'(t_i)-K_d(t_i)H'_d(t_i)P'(t_i) \quad (11)$$

where $v_d(t_i)=d_{meas}(t_i)-d'_{meas}(t_i)$ is the measurement residual, and the measurement matrix $H'_d(t_i)$ is:

$$H'_d(t_i) = \frac{\partial d'_{meas}(t_i)}{\partial x'(t_i)} = [(r'(t_i) - s)^T / d'_{meas}(t_i) 0] \quad (12)$$

and $K_d(t_i)$ is the extended Kalman filter gain given by:

$$K_d(t_i)=P'(t_i)H'^T_d(t_i)/(H'_d(t_i)P'(t_i)H'^T_d(t_i)+\sigma_d^2(t_i)) \quad (13)$$

Consider next updating the state vector estimate and error covariance matrix estimate using an indirect path measurement. The indirect path measurement is given by (8). From this, the filter's estimate of the measurement is:

$$\tau'_{meas}(t_i) = w'^T(t_i) r'(t_i) + \tau'_0(t_i) \quad (14)$$

Using Equations (8) and (14), the measurement may be written as:

$$\tau_{meas}(t_i) = \tau'_{meas}(t_i) - r'^T(t_i) e'_w(t_i) - w'^T(t_i) e'_r(t_i) + e'_w{}^T(t_i) e'_r(t_i) - e'_{\tau 0}(t_i) + n(t_i), \quad (15)$$

where $e'_r(t_i) = r'(t_i) - r(t_i)$ is the error in the a priori estimate of tag position r(t), $e'_w(t_i) = w'(t_i) - w(t_i)$ is the error in the a priori estimate of the unit vector w(t), and $e'_{\tau 0}(t_i) = \tau'_0(t_i) - \tau_0(t_i)$ is the error in the a priori estimate of the offset parameter $\tau_0$ $(t_i)$.

Assuming that the errors are sufficiently small that the second-order error term in Equation (15) may be neglected, the result is:

$$\tau_{meas}(t_i) = \tau'_{meas}(t_i) - r'^T(t_i) e'_w(t_i) - w'^T(t_i) e'_r(t_i) - e'_{\tau 0}(t_i) + n(t_i) \quad (16)$$

for the indirect path delay measurement. It follows that the measurement residual is given by:

$$v_x(t) = \tau_{meas}(t_i) - \tau'_{meas}(t_i) = -r'^T(t_i) e'_w(t_i) - w'^T(t_i) e'_r(t_i) - e'_{\tau 0}(t_i) + n(t_i) \quad (17)$$

The state vector may be updated using an indirect path measurement in several different ways. The following example assumes that the state vector estimate and the multipath parameter estimates are updated sequentially in two separate steps. In both steps, it is assumed that an extended Kalman filter is used.

The calculations are shown for processing a single multipath delay measurement from a single transmitting node; multiple indirect path delay measurements from multiple nodes at the same time may be processed sequentially using the identical extended Kalman filter equation forms.

For updating the state vector estimate using an indirect path measurement, the measurement residual $v_x(t_i)$ is written in the form:

$$v'_x(t_i) = -H'_x(t_i) e'_x(t_i) + n'_x(t_i) \quad (18)$$

where $H'_x(t_i) = [w'^T(t_i) 0]$, $e'_x(t_i) = x'(t_i) - x(t_i)$, and the measurement noise:

$$n'_x(t_i) = -r'^T(t_i) e'_w(t_i) - e'_{\tau 0}(t_i) + n(t_i) \quad (19)$$

is modeled in the filter as zero-mean white noise with variance:

$$\sigma'_{nx}{}^2(t_i) = r'^T(t_i) P'_w(t_i) r'(t_i) + \sigma'_{\tau 0}{}^2(t_i) + \sigma_n{}^2(t_i) \quad (20)$$

where $P'_w(t_i) = E\{e'_w(t_i) e'_w{}^T(t_i)\}$ is the error covariance matrix for the estimate $w'(t_i)$, and $\sigma'_{\tau 0}{}^2(t_i)$ is the error variance for the estimate $\tau'_0(t_i)$. With this assumption, the variance of the measurement residual is:

$$\sigma'_{vx}{}^2(t_i) = H'_x(t_i) P'(t_i) H'_x{}^T(t_i) + \sigma'_{nx}{}^2(t_i) \quad (21)$$

The updated estmates of the state vector and the error covariance matrix are calculated using the standard extended Kalman filter equations:

$$\hat{x}(t_i) = \hat{x}(t_i) + K_x(t_i) v_x(t_i) \quad (22)$$

$$P(t_i) = P'(t_i) - K_x(t_i) H'_x(t_i) P'(t_i) \quad (23)$$

where $K_x(t_i)$ is the extended Kalman filter gain:

$$K_x(t_i) = P'(t_i) H'_x{}^T(t_i) / \sigma'_{vx}{}^2(t_i) \quad (24)$$

For updating the multipath parameter estimates, the parameter vector is defined as:

$$\alpha(t_i) = \begin{bmatrix} w(t_i) \\ \tau_0(t_i) \end{bmatrix} \quad (25)$$

The measurement residual given in Equation (17) is now written as:

$$v'_a(t_i) = -H_a(t_i) e'_a(t_i) + n'_a(t_i) \quad (26)$$

where $H_a(t_i) = [r'^T(t_i) 1]$, $e'_a(t_i) = a'(t_i) - a(t_i)$, and the measurement noise:

$$n'_a(t_i) = -w'^T(t_i) e'_r(t_i) + n(t_i) \quad (27)$$

is modeled in the filter as zero-mean white noise with variance:

$$\sigma'_{na}{}^2(t_i) = w'^T(t_i) P'_r(t_i) w'(t_i) + \sigma_n{}^2(t_i) \quad (28)$$

where $P'_r(t_i) = E\{e'_r(t_i) e'_r{}^T(t_i)\}$ is the error covariance matrix for the tag position estimate $r'(t_i)$.

Under these assumptions, the variance of the measurement residual is:

$$\sigma'_{va}{}^2(t_i) = H'_a(t_i) P'_a(t_i) H'_a{}^T(t_i) + \sigma'_{na}{}^2(t_i) \quad (29)$$

where $P'_a(t_i) = E\{e'_a(t_i) e'_a{}^T(t_i)\}$ is the covariance matrix of the a priori parameter vector estimation $e'_a(t_i) = a'(t_i) - a(t_i)$. The updated estimates of the multipath parameter vector and the error covariance matrix are calculated using the standard extended Kalman filter equations:

$$\hat{a}(t_i) = a'(t_i) + K_a(t_i) v v(t_i) \quad (30)$$

$$P_a(t_i) = P'_a(t_i) - K_a(t_i) H'_a(t_i) P'_a(t_i) \quad (31)$$

where $K_x(t_i)$ is the extended Kalman filter gain:

$$K_a(t_i) = P'_a(t_i) H'_\alpha{}^T(t_i) / \sigma'_{va}{}^2(t_i) \quad (32)$$

Illustrative Multipath Algorithm Example

A relatively simple example of indoor navigation utilizing multipath signal delay is presented here for illustrative purposes. The scenario presented is representative of the simple case of indoor geolocation in a planar geometry utilizing two fixed transceiver nodes and a roving transceiver tag. Such a concept is representative of a number of UWB or 802.11-like approaches that have been proposed for both military and commercial applications.

The example geometry of FIGS. 9A-9D depicts a roving tag initially moving free of obstructions such that the direct line-of-sight (DLOS) path is observable and the first return may be employed for geolocation purposes. The tag is assumed to be moving in two dimensions (north and east) at a constant altitude. The geometry also includes a specular reflecting plane capable of introducing multipath signals with respect to either transmitting source.

Figure 9A:
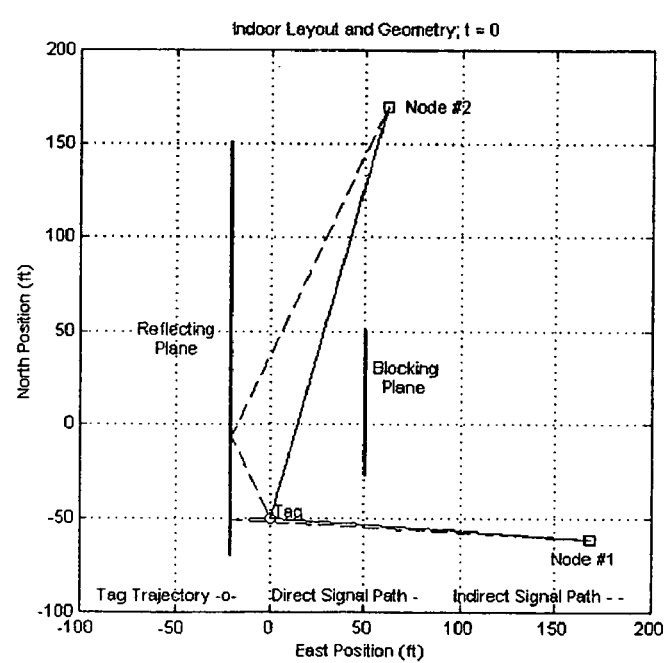
FIG. 9A presents the geometry of an illustrative simulation of multipath navigation at time 0 seconds.
Figure 9B:
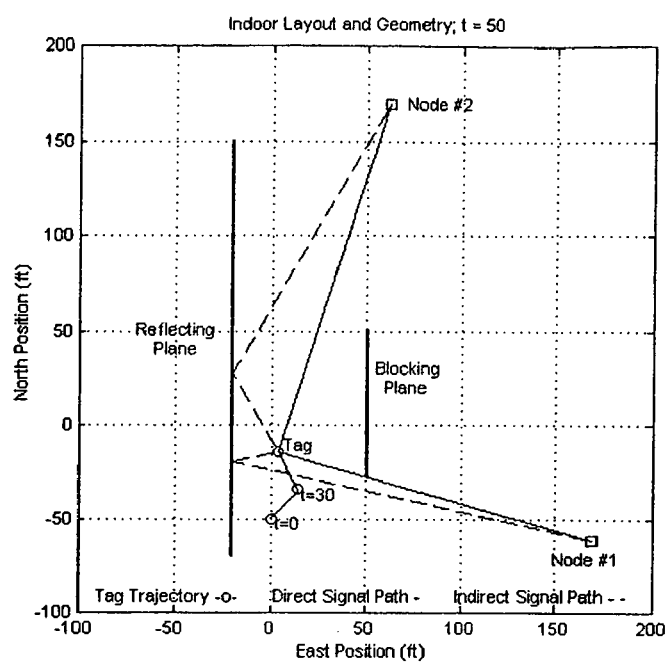
FIG. 9B depicts the geometry of an illustrative simulation of multipath navigation at time 50 seconds when signal paths are unblocked.

FIG. 9A presents the geometry at initial time (t=0). In its first 50 seconds of travel, the tag is exposed to both direct RF paths and utilizes this direct path data concerning both nodes to determine its own location and simultaneously estimate the multipath parameters for both indirect paths. FIG. 9B presents the geometry at t=50 seconds, which is the last point in the simulation in which all paths are unblocked.

Figure 9C:
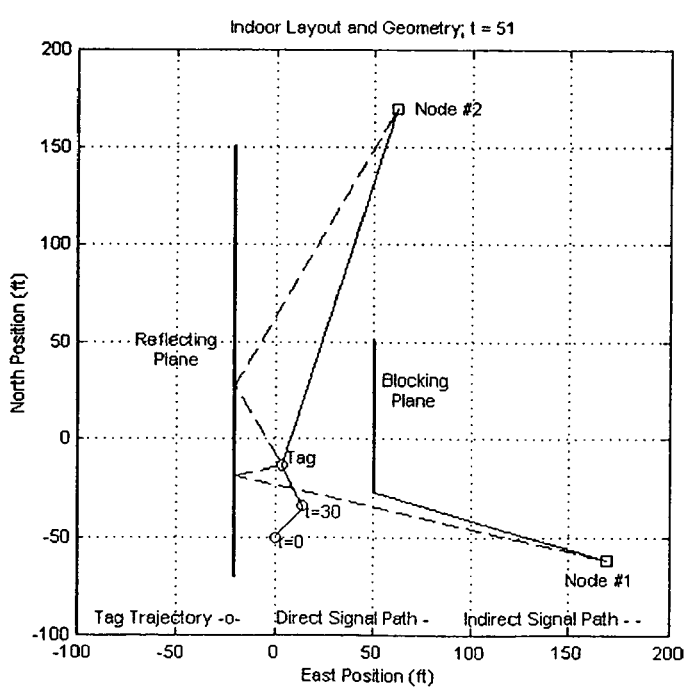
FIG. 9C shows the geometry of an illustrative simulation of multipath navigation at time 51 seconds when the direct signal path from node #1 is blocked.
Figure 9D:
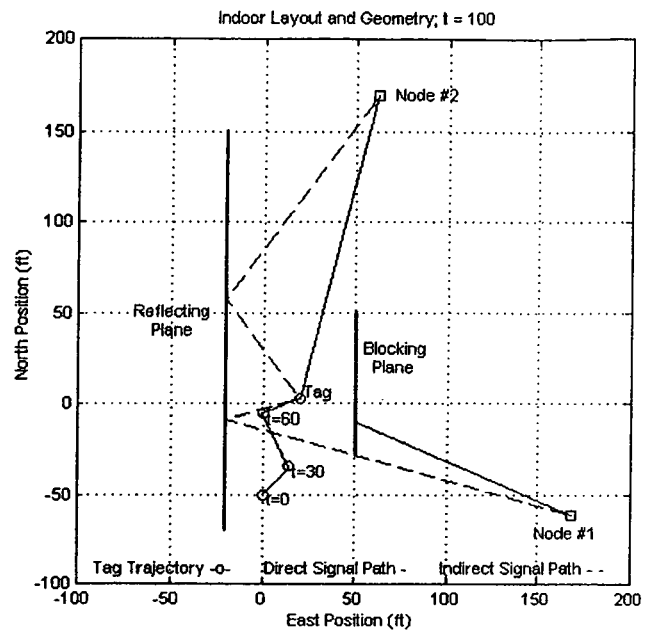
FIG. 9D presents an illustrative simulation of multipath navigation at time 100 seconds when the direct signal path from node #1 remains blocked.

FIG. 9C presents the geometry at t=51 seconds, when the direct path to node #1 becomes blocked. At this point, the system uses the node #1 indirect path and the node #2 direct path for position estimation in accord with the present invention. It is also assumed that the indirect path measurement from node #2 is no longer available after t=50 seconds. FIG. 9D presents the geometry at the final time t=100 seconds; the direct path from node #1 remains blocked.

Figure 10:
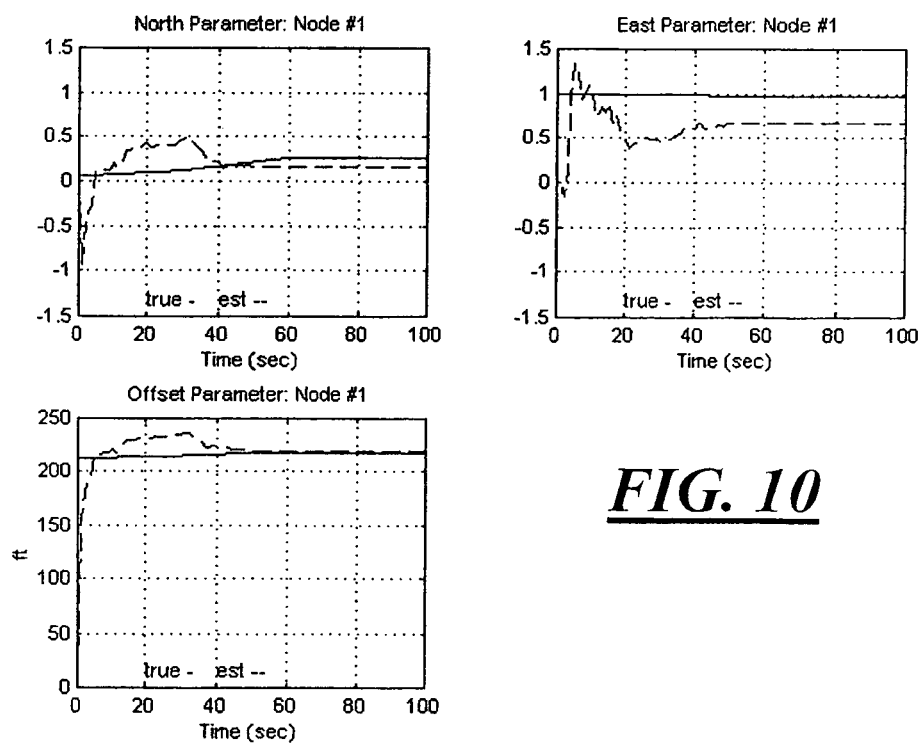
FIG. 10 shows the multipath parameter estimates at node #1 associated with the simulation of FIGS. 9A-9D in accord with one embodiment of the present invention.

As discussed above, in order to navigate employing multipath signals, four parameters are estimated for each indirect path, independent of the number of RF bounces that may occur from reflecting surfaces in each path. FIG. 10 presents the north and east offset parameters produced by the filter for node #1 during the first 50 seconds of tag travel. In this example the directional parameter vector w(t) is:

$$w(t) = \begin{bmatrix} w_{North}(t) \\ w_{East}(t) \\ w_{vertical}(t) \end{bmatrix}$$

The vertical parameter is zero for this vertical reflecting surface example. The solid line in the figure represents the true parameter value and the dotted line represents the estimated value. The parameters are estimated over the first 50 seconds only and reasonably accurate estimates are obtained after 40 seconds. The north parameter exhibits a relatively small variation over time, while the east and offset parameters exhibit negligible variation.

Figure 11:
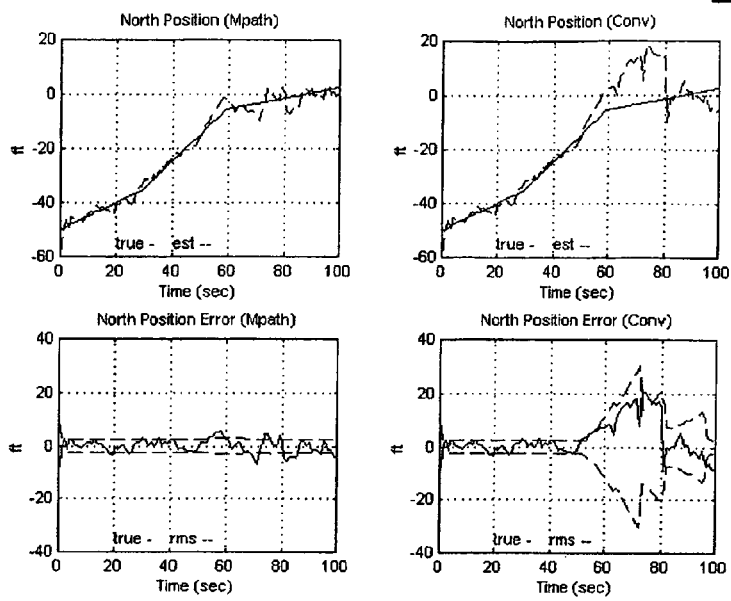
FIGS. 11 & 12 graphically present a comparison between a conventional filtering technique and one embodiment of the present invention, both applied to the simulation of FIGS. 9A-9D.
Figure 12:
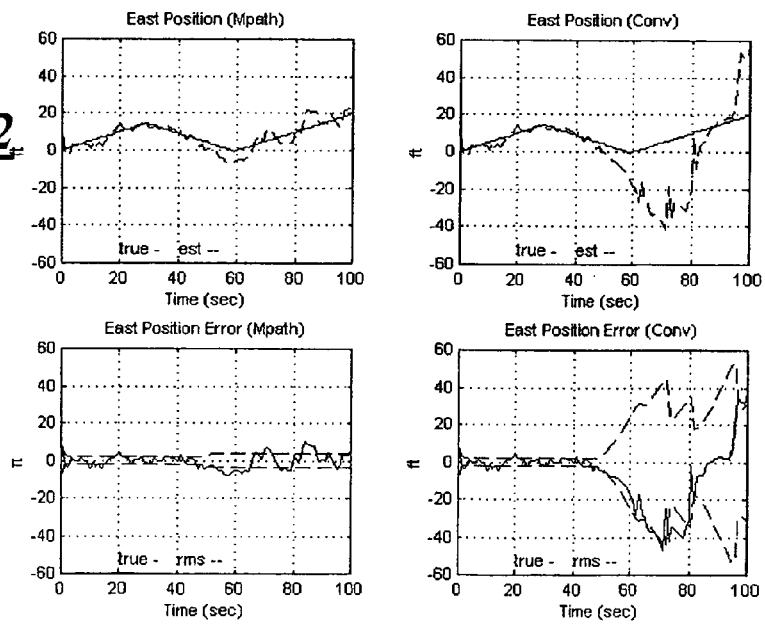

FIGS. 11 and 12 present comparative position estimates over time for a conventional technique and for the multipath technique of the present invention. The conventional filter employs only direct path measurements for its estimate. The solid line in the figures represents the actual path taken and the dotted line represents the estimates.

As is evident in FIG. 11, the conventional filter, presented on the right, cannot track path changes beyond 60 seconds (where the tag changes direction) whereas the multipath filter, presented on the left, continues to accurately track path changes when the direct path becomes blocked. The error along east is somewhat greater than along north, reflecting the inferior geometry associated with direct path measurements from node #2.

It will therefore be seen that the foregoing represents a highly advantageous approach to positioning using multipath signals. The terms and expressions employed herein are used as terms of description and not of limitation and there is no intention, in the use of such terms and expressions, of excluding any equivalents of the features shown and described or portions thereof, but it is recognized that various modifications are possible within the scope of the invention claimed.

For example, although some of the examples presented refer to transceivers sending signals to a tag, one of ordinary skill in the art would recognize that the present invention would also encompass a tag that sends signals to transceivers, or any combination of transceivers and tags that simultaneously transmit and receive signals to each other. Moreover, the process of determining the multipath parameters over time makes it possible to develop a fully-structured three-dimensional map of a building's interior from the accumulation of reflection data. Doppler measurements of the multiphase elements are also useful for observing activity elsewhere in the building complex and represent a useful byproduct of geolocation activity.

Therefore, it must be expressly understood that the illustrated embodiments have been shown only for the purposes of example and should not be taken as limiting the invention, which is defined by the following claims. The following claims are thus to be read as not only literally including what is set forth by the claims but also to include all equivalents that are insubstantially different, even though not identical in other respects to what is shown and described in the above illustrations.

Appendix A: Detailed Development of Multipath Solutions

This appendix presents the basic geometry and multipath solutions appropriate for indoor/urban navigation. The measurement equations required for solving the indoor navigation problem discussed above follow directly from the multipath solutions.

The following discussion considers the geometry associated with indirect paths having an arbitrary number of specular reflections. The one-way distance from the source to a receiver (e.g., a tag or transponder) is used as a measure of path length. The first case considered is one source and one indirect path, which generalizes trivially to any number of sources and indirect paths.

The fundamental measurements available to an indoor navigation system are the direct and indirect path lengths. The path identities (i.e., direct and indirect) are unknown and must be inferred from the measurements. It will be assumed throughout this discussion that: the identity and location of all sources is known; the locations and orientations of all reflecting surfaces are unknown; and the number of reflections associated with all indirect paths is unknown. Under these assumptions, determininistic expressions are derived for indirect path length for an arbitrary number of reflections. These expressions form the basis of the measurement equations used by the indoor navigation system.

The geometry for one specular reflection is shown in FIG. A-1. The source is at known location s and the tag is at unknown location r. The direct path length is $d_0 = \|s - r\|$, and the (one way) indirect path length is $d = d_1 + d_2$. The unit vectors $w_1$ and $w_2$ represent the direction of the incident and reflected signal, u is the unit vector normal to the reflecting plane, and p is the specular point.

The equations describing the multipath geometry for one reflection are:

$$p = s + d_1 w_1 \quad (A.1)$$

$$u^T p = b_1 \quad (A.2)$$

$$w_1 = E_1 w_2, \ E_1 = I - 2uu^T \quad (A.3)$$

$$r = p + d_2 w_2 \quad (A.4)$$

From (A.1) and (A.2):

$$d_1 = \frac{b_1 - u^T s}{u^T w_1} = \frac{u^T s - b_1}{\cos\theta} \quad (A.5)$$

From (A.1) and (A.4):

$$r = s + d_1 w_1 + d_2 w_2 = s + d_1(w_1 - w_2) + dw_2 \quad (A.6)$$

so that:

$$d = w_2^T r - w_2^T s + d_1(1 - w_2^T w_1) \quad (A.7)$$

Using $E_1^{-1} = E_1$, the result is $w_2 = w_1 2u \cos\theta$, $1 - w_2^T w_1 2 = \cos^2\theta$, so that:

$$d = w_2^T r - w_2^T s + 2d_1 \cos^2\theta \quad (A.8)$$

-continued $$= w_2^T r - w_2^T s + 2(u^T s - b_1)\cos\theta$$

$$= w_2^T r - w_2^T E_1 s - 2b_1 \cos\theta$$

$$= w_2^T r - w_1^T s - 2b_1 \cos\theta$$

$$= w_2^T r + c_1$$

The geometry for two specular reflections is shown in Figure A-2. The equations describing this multipath geometry are:

$$p_1 = s + d_1 w_1, \ p_2 = s + d_1 w_1 + d_2 w_2 \quad (A.9)$$

$$u_1^T p_1 = b_1, \ u_2^T p_2 = b_2 \quad (A.10)$$

$$w_1 = E_1 w_2, \ E_1 = I - 2u_1 u_1^T \quad (A.11)$$

$$w_2 = E_2 w_3, \ E_2 = I - 2u_2 u_2^T \quad (A.12)$$

$$r = p_2 + d_3 w_3 \quad (A.13)$$

$$d = d_1 + d_2 + d \quad (A.14)$$

From (A.9) and (A.10):

$$d_1 = \frac{u_1^T s - b_1}{\cos\theta_1}, \quad (A.15)$$

$$d_2 = \frac{u_2^T s - b_2 + d_1 u_2^T w_1}{\cos\theta_2}$$

and from (A.9) and (A.13):

$$r = s + d_1 w_1 + d_2 w_2 + d_3 w_3 \quad (A.16)$$

$$= s + d_1(w_1 - w_3) + d_2(w_2 - w_3) + d w_3$$

$$d = w_3^T r - w_3^T s + d_1(1 - w_3^T w_1) + d_2(1 - w_3^T w_2) \quad (A.17)$$

$$= w_3^T r - w_3^T s + d_1\left[(1 - w_3^T w_1) + \frac{u_2^T w_1}{\cos\theta_2}(1 - w_3^T w_2)\right] +$$

$$\frac{u_2^T s - b_2}{\cos\theta_2}(1 - w_3^T w_2)$$

From (A.12), and using $E_2^{-1} = E_2$, the result is $w_3 = w_2 + 2u_2 \cos\theta_2$, $1 - w_3^T w_2 = 2\cos^2\theta_2$. Thus:

$$d = w_3^T r - w_3^T s + d_1(1 - w_3^T w_1 + 2u_2^T w_1 \cos\theta_2) + 2(u_2^T s - b_2)\cos\theta_2 \quad (A.18)$$

Now letting $w_3 = w_1 + 2u_1 \cos\theta_1 + 2u_2 \cos\theta_2$, the result is $1 - w_3^T w_1 = 2\cos^2\theta_1 - 2u_2^T w_1 \cos\theta_2$, so that:

$$d = w_3^T r - w_3^T s + 2d_1 \cos^2\theta_1 + 2(u_2^T s - b_2)\cos\theta_2 \quad (A.19)$$

$$= w_3^T r - w_3^T s + 2(u_1^T s - b_1)\cos\theta_1 + 2(u_2^T s - b_2)\cos\theta_2$$

$$= w_3^T r - (w_3^T - 2u_1^T \cos\theta_1 - 2u_2^T \cos\theta_2)s -$$

$$2b_1 \cos\theta_1 - 2b_2 \cos\theta_2$$

$$= w_3^T r - w_1^T s - 2b_1 \cos\theta_1 - 2b_2 \cos\theta_2$$

$$= w_3^T r + c_2$$

Based on (A.8) and (A.19), it can be hypothesized that the indirect path length for m specular reflections is:

$$d = w_{m+1}^T r + c_m \quad (A.20)$$

$$c_m = -w_1^T s - 2b_1 \cos\theta_1 - 2b_2 \cos\theta_2 - \ldots - 2b_m \cos\theta_m \quad (A.21)$$

This is now demonstrated by induction to be true. The relevant equations are:

$$p_i = s + \sum_{j=1}^{i} d_j w_j; \quad i = 1, 2, \ldots, m \quad (A.22)$$

$$u_i^T p_i = b_i; \quad i = 1, 2, \ldots, m \quad (A.23)$$

$$w_i = E_i w_{i+1}, \quad (A.24)$$

$$E_i = I - 2u_i u_i^T,$$

$$E_i = E_i^{-1}; \quad i = 1, 2, \ldots, m$$

$$u_i^T w_i = -\cos\theta_i; \quad i = 1, 2, \ldots, m \quad (A.25)$$

$$r = p_m + d_{m+1} w_{m+1} \quad (A.26)$$

$$d = \sum_{j=1}^{i} d_j; \quad i = 1, 2, \ldots, m \quad (A.27)$$

$$w_i^T w_i = 1; \quad i = 1, 2, \ldots, m+1 \quad (A.28)$$

From (A.22) and (A.26):

$$r = s + \sum_{i=1}^{m+1} d_i w_i \quad (A.29)$$

$$= s + \sum_{i=1}^{m} d_i(w_i - w_{m+1}) + d w_{m+1} \text{ using,} \quad (A.27)$$

Thus:

$$d = w_{m+1}^T r - w_{m+1}^T s + \sum_{i=1}^{m} d_i(1 - w_{m+1}^T w_i) \quad (A.30)$$

$$= w_{m+1}^T r - w_{m+1}^T s + \sum_{i=1}^{m-1} d_i(1 - w_{m+1}^T w_i) + d_m(1 - w_{m+1}^T w_m)$$

From (A.24) and (A.25):

$$w_{i+1} = w_i + 2u_i \cos\theta_i; \ i = 1, 2, \ldots, m \quad (A.31)$$

Thus:

$$d = w_{m+1}^T r - w_{m+1}^T s + \sum_{i=1}^{m-1} d_i(1 - w_{m+1}^T w_i) + 2d_m \cos^2\theta_m \quad (A.32)$$

And from (22) and (23):

$$d_i = \frac{u_i^T s - b_i + \sum_{j=1}^{i-1} d_j u_i^T w_j}{\cos\theta_i}; \quad i = 1, 2, \ldots, m \quad (A.33)$$

Thus:

$$d = w_{m+1}^T r - w_{m+1}^T s + \sum_{i=1}^{m-1} d_i(1 - w_{m+1}^T w_i) + \quad (A.34)$$

$$2\left[u_m^T s - b_m + \sum_{j=1}^{m-1} d_j u_m^T w_j\right]\cos\theta_m$$

$$= w_{m+1}^T r - w_{m+1}^T s + \sum_{i=1}^{m-1} d_i(1 - w_{m+1}^T w_i + 2u_m^T w_i \cos\theta_m) +$$

$$2u_m^T s\cos\theta_m - 2b_m\cos\theta_m$$

$$= w_{m+1}^T r - w_m^T s + \sum_{i=1}^{m-1} d_i(1 - w_m^T w_i) - 2b_m\cos\theta_m \text{ using} \quad (A.31)$$

Continuing:

$$d = w_{m+1}^T r - w_m^T s + \sum_{i=1}^{m-2} d_i(1 - w_m^T w_i) + d_{m-1}(1 - w_m^T w_{m-1}) - \quad (A.35)$$

$$2b_m\cos\theta_m$$

$$= w_{m+1}^T r - w_m^T s + \sum_{i=1}^{m-2} d_i(1 - w_m^T w_i) - 2b_{m-1}\cos^2\theta_{m-1} -$$

$$2b_m\cos\theta_m$$

$$= w_{m+1}^T r - w_m^T s + \sum_{j=1}^{m-2} d_i(1 - w_m^T w_i) - 2b_m\cos\theta_m +$$

$$2\left[u_{m-1}^T s - b_{m-1} + \sum_{i=1}^{m-2} d_j u_{m-1}^T w_j\right]\cos\theta_{m-1}$$

$$= w_{m+1}^T r - w_m^T s + \sum_{i=1}^{m-2} d_i(1 - w_m^T w_i + 2u_{m-1}^T w_i\cos\theta_{m-1}) +$$

$$2u_{m-1}^T s\cos\theta_{m-1} - 2b_{m-1}\cos\theta_{m-1} - 2b_m\cos\theta_m$$

$$= w_{m+1}^T r - w_{m-1}^T s + \sum_{i=1}^{m-2} d_i(1 - w_{m-1}^T w_i) - 2b_{m-1}\cos\theta_{m-1} -$$

$$2b_m\cos\theta_m.$$

By induction, it is apparent from (A.30), (A.34) and (A.35) that:

$$d = w_{m+1}^T r - w_k^T s + \sum_{i=1}^{k-1} d_i(1 - w_k^T w_i) - 2\sum_{j=k}^{m} b_j\cos\theta_j; \quad (A.36)$$

$$k = 1, 2, \ldots, m+1$$

The case of particular interest is k=1, which gives:

$$d = w_{m+1}^T r - w_1^T s - 2\sum_{j=1}^{m} b_j\cos\theta_j \quad (A.37)$$

and verifies the hypothesis posed in (A.21). Note that the direct path length for any number of reflections may be written as:

$$d = w^T r + c; \quad (A.38)$$

$$c = -w_1^T s - 2\sum_{j=1}^{m} b_j\cos\theta_j$$

where w is the unit vector along the ray from the last reflecting surface and c is a constant which depends on the source location; the unit vector along the ray from the source to the first reflecting plane; all of the reflection angles; and all of the reflecting plane locations.

Equation (A.38) forms the basis of the measurement equations used in the indoor navigation system. It is worth noting that (A.38) is a phenomenological model of the indirect path length that explicitly contains exactly four indirect path parameters {w, c} for any number of reflections. This implies that navigation using indirect path measurements can be accomplished if the four indirect path parameters associated with the current measurement are known or can be estimated with sufficient accuracy. Moreover, the four indirect path parameters are not independent, since w is uniquely defined by two angles. Thus, the phenomenological model of indirect path length actually contains three independent parameters.

To simulate the performance of the indoor navigation system, the full solution associated with all indirect paths is calculated in the simulation. Within the simulation, the tag location r is known, and the locations {$b_i$; i=1, 2, ..., m}, orientations {$u_i$; i=1, 2, ..., m}, and sizes of all reflecting surfaces are known. With this information, it is possible to determine the full indirect path solutions under the assumption that the sequence of reflections (i.e., the identity of the reflecting planes in sequence) is known. For the simulations used in the preliminary feasibility analysis, this assumption will always hold. In the more general case, ray tracing (which typically requires considerably more computing resources) may be used.

For one reflection, we have, from (A.3) and (A.6):

$$r = s - 2d_1 u\cos\theta + dw_2 \quad (A.39)$$
$$= E_1 s + 2b_1 u + dw_2 \text{ from.} \quad (A.5)$$

The full solution is found as follows. First calculate:

$$d = \|r - E_1 s - 2b_1 u\|, \; w_2 = \text{unit}(r - E_1 s - 2b_1 u) \quad (A.40)$$

Then:

$$\cos\theta = u^T w_2, \quad (A.41)$$

$$d_1 = \frac{u^T s - b_1}{\cos\theta},$$

$$w_1 = E_1 w_2,$$

$$p = s + d_1 w_1$$

For two reflections, we have, from (A.11) and (A.16):

$$r = s + d_1(w_1 - w_3) + d_2(w_2 - w_3) + dw_3 \quad (A.42)$$

Setting $w_2 = w_3 - 2u_2 \cos\theta_2$:

$$
\begin{aligned}
r &= s + d_1(w_1 - w_2 - 2u_2\cos\theta_2) - 2d_2\cos\theta_2 u_2 + dw_3 \\
&= s + d_1(w_1 - w_2 - 2u_2\cos\theta_2) - \\
&\quad 2(u_2^T s - b_2 + d_1 u_2^T w_1)u_2 + dw_3 \text{ from} \\
&= s + d_1(w_1 - w_2 - 2u_2\cos\theta_2 - 2u_2^T w_1 u_2) - 2(u_2^T s - b_2)u_2 + dw_3
\end{aligned} \quad (A.43)
$$

Then, setting $w_1 = w_2 - 2u_1 \cos\theta_1$:

$$
\begin{aligned}
r &= E_2 s + d_1[-2u_1\cos\theta_1 - \\
&\quad 2u_2\cos\theta_2 - 2u_2 u_2^T(w_2 - 2u_1\cos\theta_1)] + 2b_2 u_2 + w_3 \\
&= E_2 s + d_1[-2u_1\cos\theta_1 + 4u_2 u_2^T u_1\cos\theta_1)] + 2b_2 u_2 + dw_3 \\
&= E_2 s - 2d_1 E_2 u_1 \cos\theta_1 + 2b_2 u_2 + dw_3 \\
&= E_2 s - 2(u_1^T s - b_1)E_2 u_1 + 2b_2 u_2 + dw_3 \text{ from} \\
&= E_2 E_1 s + 2b_1 E_1 u_1 + 2b_2 u_2 + dw_3
\end{aligned} \quad (A.44)
$$

The full solution for two reflections is found as follows. First calculate:

$$d = \|r - E_2 E_1 s - 2b_1 E_1 u_1 - 2b_2 u_2\| \quad (A.45)$$

$$w_3 = \text{unit}(r - E_2 E_1 s - 2b_1 E_1 u_1 - 2b_2 u_2) \quad (A.46)$$

Then:

$$w_2 = E_2 w_3, \quad w_1 = E_1 w_2 \quad (A.47)$$

$$\cos\theta_2 = u_2^T w_3, \quad \cos\theta_1 = u_1^T w_2 \quad (A.48)$$

$$d_1 = \frac{u_1^T s - b_1}{\cos\theta_1}, \quad d_2 = \frac{u_2^T s - b_2 + d_1 u_2^T w_1}{\cos\theta_2} \quad (A.49)$$

and the specular points are found using (A.9).

For m reflections, the relevant equations are:

$$r = s + \sum_{i=1}^{m} d_i(w_i - w_{m+1}) + dw_{m+1} \quad (A.50)$$

along with (A.31) and (A.33). Then:

$$
\begin{aligned}
r &= s + \sum_{i=1}^{m-1} d_i(w_i - w_{m+1}) + d_m(w_m - w_{m+1}) + dw_{m+1} \\
&= s + \sum_{i=1}^{m-1} d_i(w_i - w_{m+1}) - 2u_m d_m \cos\theta_m + dw_{m+1} \text{ using} \\
&= s + \sum_{i=1}^{m-1} d_i(w_i - w_{m+1}) - 2u_m \left[ u_m^T s - b_m + \sum_{i=1}^{m-1} d_i u_m^T w_i \right] + dw_{m+1} \\
&= E_m s + \sum_{i=1}^{m-1} d_i(w_i - w_{m+1} - 2u_m u_m^T w_i) + 2b_m u_m + dw_{m+1} \\
&= E_m s + \sum_{i=1}^{m-1} d_i(E_m w_i - w_{m+1}) + 2b_m u_m + dw_{m+1} \\
&= E_m s + E_m \sum_{i=1}^{m-1} d_i(w_i - w_m) + 2b_m u_m + dw_{m+1}
\end{aligned} \quad (A.31), (A.33), (A.51)
$$

Continuing:

$$
\begin{aligned}
r &= E_m s + E_m \sum_{i=1}^{m-2} d_i(w_i - w_m) + d_{m-1} E_m(w_{m-1} - w_m) + \\
&\quad 2b_m u_m + dw_{m+1} \\
&= E_m s + E_m \sum_{i=1}^{m-2} d_i(w_i - w_m) - 2d_{m-1}\cos\theta_{m-1} E_m u_{m-1} + \\
&\quad 2b_m u_m + dw_{m+1} \\
&= E_m s + E_m \sum_{i=1}^{m-2} d_i(w_i - w_m) + 2b_m u_m + dw_{m+1} - \\
&\quad 2E_m u_{m-1}\left[ u_{m-1}^T s - b_{m-1} + \sum_{i=1}^{m-2} d_i u_{m-1}^T w_i \right] \\
&= E_m E_{m-1} s + E_m \sum_{i=1}^{m-2} d_i(w_i - w_m - 2u_{m-1} u_{m-1}^T w_i) + \\
&\quad 2b_{m-1} E_m u_{m-1} + 2b_m u_m + dw_{m+1} \\
&= E_m E_{m-1} s + E_m \sum_{i=1}^{m-2} d_i(E_{m-1} w_i - w_m) + 2b_{m-1} E_m u_{m-1} + \\
&\quad 2b_m u_m + dw_{m+1} \\
&= E_m E_{m-1} s + E_m E_{m-1} \sum_{i=1}^{m-2} d_i(w_i - w_{m-1}) + 2b_{m-1} E_m u_{m-1} + \\
&\quad 2b_m u_m + dw_{m+1} \\
&= E_m E_{m-1}\left[ s + \sum_{i=1}^{m-2} d_i(w_i - w_{m-1}) \right] + 2b_{m-1} E_m u_{m-1} + \\
&\quad 2b_m u_m + dw_{m+1}
\end{aligned} \quad (A.52)
$$

From (A.50), (A.51) and (A.52), we have, by induction:

$$r = M_k\left[ s + \sum_{i=1}^{k-1} d_i(w_i - w_k) \right] + 2\sum_{i=k}^{m} b_i M_{i+1} u_i + dw_{m+1}; \quad (A.53)$$

$$k = 1, 2, \ldots, m+1$$

where $$M_k = \prod_{i=k}^{m} E_i \quad (A.54)$$

and $M_{m+1} = I$. One case of interest is $k=1$ for which:

$$r = M_1 s + 2\sum_{i=1}^{m} b_i M_{i+1} u_i + dw_{m+1} \quad (A.55)$$

The full solution is found as follows. First calculate:

$$d = \left\| r - M_1 s - 2\sum_{i=1}^{m} b_i M_{i+1} u_i \right\|, \quad (A.56)$$

$$w_{m+1} = \text{unit}\left( r - M_1 s - 2\sum_{i=1}^{m} b_i M_{i+1} u_i \right)$$

Then calculate:

$$w_i = E_i w_{i+1}, \cos\theta_i = -u_i^T w_i; \, i=m, m-1, \ldots, 1 \quad (A.57)$$

Then the distances $\{d_i;\, i=1, 2, \ldots, m\}$ can be calculated from (A.33), and the specular points $\{p_i;\, i=1, 2, \ldots, m\}$ can be calculated using (A.22).

What is claimed is:

1. A method for positioning using a multipath wireless signal, the method comprising the steps of:
   receiving a plurality of wireless signals comprising multipath signals;
   processing the plurality of wireless signals to identify at least one indirect path;
   determining an initial estimate for $\{r\}$, wherein $\{r\}$ is a position of a receiver;
   determining initial estimates of and $\{w_n, \tau_{0n}\}$ for the at least one indirect path based on a parametric model relating $\{r\}$ to a length of the at least one indirect path, the parametric model assuming, without prior knowledge of a local infrastructure or propagation channels associated with the at least one indirect path, that at least one multipath signal has experienced at least one specular reflection off a planar surface along the at least one indirect path before reaching the receiver;
   receiving a subsequent plurality of wireless signals comprising multipath signals; and
   updating the initial estimates of $\{r\}$ and $\{w_n, \tau_{0n}\}$ using a nonlinear filter and the subsequent plurality of wireless signals applied to that filter,
   wherein $w_n$ is a unit vector in a direction of the at least one indirect path from a reflecting surface closest to the receiver and $\tau_{0n}$ is a scalar geometry-dependent offset associated by the parametric model to the length of the at least one indirect path.

2. The method of claim 1 wherein determining an initial estimate for $\{r\}$ comprises:
   receiving, at a plurality of positions, at least one transmitted signal;
   determining the magnitude of the at least one signal received at each position; and
   using the determined signal magnitudes and a statistical model to estimate the initial position.

3. The method of claim 2 wherein the statistical model comprises data indicative of signal propagation characteristics associated with a signal space between the receiver and one or more transmitters.

4. The method of claim 1 wherein determining an initial estimate for $\{r\}$ comprises computing a plurality of candidate locations and selecting a most likely location therefrom.

5. The method of claim 4 wherein the most likely location is determined using a statistical test.

6. The method of claim 1 wherein the wireless signals are generated by a Global Positioning System (GPS) transmitter.

7. The method of claim 1 wherein the wireless signals are generated by a transmitter.

8. The method of claim 1 wherein determining an initial estimate for $\{r\}$ comprises making a direct path measurement of an initial position of the receiver.

9. The method of claim 8 wherein the direct path measurement is a measurement of received signal strength.

10. The method of claim 1 wherein determining an initial estimate for $\{r\}$ comprises utilizing prior knowledge of an initial position of the receiver.

11. The method of claim 1 wherein processing the plurality of wireless signals to identify the at least one indirect path comprises modeling path lengths using ordinary least squares analysis and a polynomial model.

12. An apparatus for positioning using a multipath wireless signal, the apparatus comprising:
   a receiver for receiving a plurality of wireless signals comprising multipath signals; and
   a processor configured to (i) process the plurality of wireless signals to identify at least one indirect path, (ii) determine an initial estimate of $\{r\}$, wherein $\{r\}$ is a position of the receiver, (iii) determine initial estimates of $\{w_n, \tau_{0n}\}$ for the at least one indirect path based on a parametric model relating $\{r\}$ to a length of the at least one indirect path, the parametric model assuming, without prior knowledge of a local infrastructure or propagation channels associated with the at least one indirect path, that at least one multipath signal has experienced at least one specular reflection off a planar surface along the at least one indirect path before reaching the receiver, and (iv) update the initial estimates of $\{r\}$ and $\{w_n, \tau_{0n}\}$ using a nonlinear filter and subsequent wireless signals applied to that filter,
   wherein $w_n$ is a unit vector in a direction of the at least one indirect path from a reflecting surface closest to the receiver and $\tau_{0n}$ is a scalar geometry-dependent offset associated by the parametric model to the length of the at least one indirect path.

13. The apparatus of claim 12 wherein the wireless signals are generated by a Global Positioning System (GPS) transmitter.

14. The apparatus of claim 12 wherein the wireless signals are generated by a transmitter.

* * * * *

UNITED STATES PATENT AND TRADEMARK OFFICE
CERTIFICATE OF CORRECTION

PATENT NO. : 7,679,561 B2  Page 1 of 1
APPLICATION NO. : 11/335160
DATED : March 16, 2010
INVENTOR(S) : John M. Elwell, Jr. et al.

It is certified that error appears in the above-identified patent and that said Letters Patent is hereby corrected as shown below:

On the front page of the patent, INID 56, in the "OTHER PUBLICATIONS" section, the following document is also listed:

-- International Search Report of PCT/US06/001811, mailed June 19, 2006. --

In Claim 1, column 21, line 25, delete "and".

Signed and Sealed this

Fifteenth Day of June, 2010

David J. Kappos
*Director of the United States Patent and Trademark Office*